United States Patent
Haydock et al.

(10) Patent No.: US 6,801,019 B2
(45) Date of Patent: Oct. 5, 2004

(54) AC POWER GENERATING SYSTEM

(75) Inventors: Lawrence Haydock, Peterborough (GB); Wlodzimierz Koczara, Warsaw (PL); Nazar Al-Khayat, Oakham (GB); Neil Brown, Holbeach (GB); Denis Hedley Dalby, Oakham (GB); Jawad Al-Tayie, Stamford (GB); Robert Pawel Dziuba, Warsaw (PL); Jaroslaw Leonarski, Olszewo-Borki (PL); George Williamson Laird, Stamford (GB)

(73) Assignee: Newage International Limited, Lincolnshire (GB)

(*) Notice: Subject to any disclaimer, the term of this patent is extended or adjusted under 35 U.S.C. 154(b) by 75 days.

(21) Appl. No.: 10/182,529
(22) PCT Filed: Jan. 16, 2001
(86) PCT No.: PCT/GB01/00169
§ 371 (c)(1),
(2), (4) Date: Dec. 31, 2002
(87) PCT Pub. No.: WO01/56133
PCT Pub. Date: Aug. 2, 2001

(65) Prior Publication Data
US 2003/0107349 A1 Jun. 12, 2003

(30) Foreign Application Priority Data
Jan. 28, 2000 (GB) .............................................. 0002046
Dec. 15, 2000 (GB) .............................................. 0030662
Dec. 21, 2000 (GB) .............................................. 0031290

(51) Int. Cl.[7] .............................. H02P 9/02; H02P 9/00; F03D 7/00; H02K 7/00
(52) U.S. Cl. .............................. 322/17; 322/7; 322/16; 322/28; 290/40 C; 290/44
(58) Field of Search .............................. 322/28, 17, 16, 322/7, 4; 290/44, 40 C

(56) References Cited

U.S. PATENT DOCUMENTS 3,775,663 A    11/1973   Turnbull ....................... 363/41
4,376,250 A  *  3/1983   Baker et al. ................. 307/150

(List continued on next page.)

FOREIGN PATENT DOCUMENTS

| EP | 0331849 | 9/1989 |
| GB | 2318000 | 4/1998 |
| WO | WO8703928 | 7/1987 |
| WO | WO9807224 | 2/1998 |
| WO | WO9828832 | 7/1998 |

Primary Examiner—Nicholas Ponomarenko
Assistant Examiner—Pedro J. Cuevas
(74) Attorney, Agent, or Firm—J. Bruce Schelkopf; Gary M. Gron

(57) ABSTRACT

An electric power generating set which automatically varies its speed to match load variations at any time includes an engine driven generator G which provides a positive, Ga and a negative, Gb AC output voltage each of which is rectified by a respective rectifier Re3a, Re3b. Each rectifier Re3a, Re3b has one terminal connected to a common neutral line N. The DC output voltage of each rectifier Re3a, Re3b is boosted in a respective booster circuit which also has one terminal connected to the neutral line N. The combined output of the two booster circuits, Va+Vb is fed to an Inverter IN which converts it to the AC power output of the generating set. A DC load current between the booster circuits and the inverter IN is monitored and used to provide a speed demand feedback signal Srs to the speed control of the engine EN. The inverter IN is controlled so that the voltage and frequency of the AC power output of the generating set are reduced in response to a fall in the intermediate DC voltage Va+Vb that is fed to the inverter IN and which is monitored by a voltage sensor Vsab.

46 Claims, 12 Drawing Sheets

U.S. PATENT DOCUMENTS

| | | | |
|---|---|---|---|
| 4,385,267 A | * 5/1983 | Herbert et al. | 318/732 |
| 4,385,268 A | * 5/1983 | Herbert et al. | 318/732 |
| 4,475,150 A | * 10/1984 | D'Atre et al. | 363/51 |
| 4,507,724 A | * 3/1985 | Glennon | 363/98 |
| 4,545,002 A | * 10/1985 | Walker | 363/37 |
| 5,083,039 A | * 1/1992 | Richardson et al. | 290/44 |
| 5,198,698 A | 3/1993 | Paul et al. | 307/64 |
| 5,225,712 A | * 7/1993 | Erdman | 290/44 |
| 5,301,098 A | * 4/1994 | Dhyanchand et al. | 363/97 |
| 5,334,877 A | * 8/1994 | Mohan et al. | 307/46 |
| 5,563,802 A | 10/1996 | Plahn et al. | 364/492 |
| 5,604,411 A | * 2/1997 | Venkitasubrahmanian et al. | 315/307 |
| 5,606,244 A | 2/1997 | Migdal | 322/7 |
| 5,646,510 A | * 7/1997 | Kumar | 322/16 |
| 5,691,605 A | * 11/1997 | Xia et al. | 315/307 |
| 5,731,681 A | * 3/1998 | Inaniwa et al. | 318/729 |
| 5,811,960 A | 9/1998 | Van Sickle et al. | 322/4 |
| 5,907,191 A | * 5/1999 | Sasaki et al. | 290/19 |
| 5,929,538 A | * 7/1999 | O'Sullivan et al. | 307/66 |
| 5,992,950 A | * 11/1999 | Kumar et al. | 303/151 |
| 5,998,880 A | * 12/1999 | Kumar | 290/40 B |
| 6,051,940 A | * 4/2000 | Arun | 315/307 |
| 6,072,302 A | * 6/2000 | Underwood et al. | 322/17 |
| 6,160,722 A | * 12/2000 | Thommes et al. | 363/37 |
| 6,275,392 B1 | * 8/2001 | Streicher et al. | 363/35 |
| 6,288,916 B1 | * 9/2001 | Liu et al. | 363/37 |
| 6,414,400 B1 | * 7/2002 | Scott et al. | 290/40 C |
| 6,456,508 B1 | * 9/2002 | Namai et al. | 363/17 |
| 6,493,243 B1 | * 12/2002 | Real | 363/17 |
| 6,518,736 B2 | * 2/2003 | Sasaki et al. | 322/16 |
| 6,577,136 B1 | * 6/2003 | Marques | 324/426 |
| 6,654,261 B2 | * 11/2003 | Welches et al. | 363/41 |
| 6,686,718 B2 | * 2/2004 | Jadric et al. | 318/801 |

* cited by examiner

AC POWER GENERATING SYSTEM

This invention relates to an AC power generating system in which an AC power output is produced by conversion from an intermediate DC output.

WO98/28832 discloses a generating set which comprises an engine/generator which provides a variable voltage electrical output, this output being rectified and fed to a DC to DC converter, the output DC voltage of the DC to DC converter being monitored by a control circuit and serving as an intermediate DC output which is fed to an inverter to generate an AC output which supplies an external load. The DC to DC converter decouples or isolates the intermediate DC output from the fluctuations in the current and/or voltage output of the generator so that the apparatus is able to accommodate substantial variations in the output of the generator while maintaining the intermediate DC output within desired operating parameters. The DC to DC converter also serves to decouple or isolate the generator from variations in the load. An energy storage device, for example a capacitor, is connected in parallel with the DC link and thereby provides a short term energy reserve when the load applied to the DC link voltage varies suddenly. This energy storage device may be supplemented by other similar devices with respective control systems. In some cases such supplementary energy storage devices may be excluded. Instead a load anticipation circuit may be introduced to cope with high impact or step loads.

The concept of power generation by such a generating set which automatically varies its speed to match load variations at any time is to operate the prime mover at an optimum speed, based on efficiency or fuel economy or low noise or any other desirable parameter, while providing the required engine kW output to satisfy the load demand and any losses in the system. To achieve this, the control circuit includes various electronic controllers which monitor and control the intermediate DC output or link voltage across a capacitor, through a voltage sensor and a feedback signal voltage.

The measurement and control circuit of the generating set disclosed in WO98/28832 monitors the generator output voltage and current together with the DC link voltage and operates through a feedback control loop to vary the speed of the engine so as maintain the DC link voltage constant and limit the generator output current to a level determined a current reference signal.

U.S. Pat. No. 5,563,802 discloses an integrated power system which includes an engine/generator power supply integrated with storage batteries to provide household-like AC power. For a small load demand, the storage batteries are used to provide electricity. For a large load demand, the engine/generator starts to supply electricity. The engine/generator also recharges the storage batteries if the load demand is smaller than the engine/generator maximum load capacity. For a larger load demand, both the engine/generator and the storage batteries supply electricity in parallel. The engine speed is variable for various loads. A pulse-width modulated signal is generated which monitors the DC voltage of the high voltage DC bus. This arrangement provides the variable engine speed system by speeding up or slowing down as the system power requirements change so as to maintain the voltage on the high voltage DC bus substantially constant. The bigger the load, the higher the engine speed that is required to produce the necessary power and keep a constant DC voltage.

U.S. Pat. No. 5,198,698 discloses an auxiliary power supply system including an internal combustion engine driving an alternator the output of which is rectified and supplied to DC bus lines across which a storage battery is connected. The DC bus lines may supply a consuming device such as an uninterruptible power supply or telecommunications system. The voltage across the bus lines is sensed and when the voltage drops below a selected value, indicating that the consuming device is drawing power from the battery beyond a desired limit, the engine is turned on for a period of time to warm it up, during which the power from the generator is not supplied to the DC bus lines. Thereafter, the generator supplies power to the DC bus lines to supply the consuming device and partially recharge the battery until the consuming device is no longer drawing power, after which the engine is shut off. The power supply system includes a controller which monitors the intervals of time between turn-ons of the engine and if a selected period of time is exceeded, the engine is started without supplying power from the generator to the DC bus lines to allow the engine and generator to warm-up, enhancing maintenance of the system. The operating characteristics of the engine and generator are sensed and stored for access by an operator and warnings are provided if these conditions exceed acceptable limits.

One object of one aspect of this invention is to enable operation of such a generating set without there having to be an energy storage device connected in parallel with the DC link to provide a short term energy reserve when the load applied to the DC link voltage varies suddenly.

According to one aspect of this invention there is provided an AC power generating system including inverter means which are operable to convert an intermediate DC voltage into an AC power output, means for generating and maintaining the intermediate DC voltage at one level and voltage sensor means operable to monitor the intermediate DC voltage, wherein control means are provided for the inverter means, said control means being responsive to the voltage sensor means and being operable to control operation of the inverter means so the voltage and/or the frequency of the AC power output is/are reduced in response to a fall in the intermediate DC voltage to a certain level caused by the application of a step load to the AC power output, whereby to provide a transient off-loading effect which will give the generating means time to respond and thereby allow the intermediate DC voltage to be restored to said one level.

The means for generating and maintaining the intermediate DC voltage of a preferred embodiment of this aspect of the invention include generator means operable to generate a variable voltage AC power supply and rectifier means having an output and operable to rectify the variable voltage AC power supply to establish the intermediate DC voltage.

Conveniently the generator means are driven by a variable speed prime mover, the control means of the generator means comprising speed control means operable to control the speed of the prime mover. Preferably the generator means-are a prime mover driven permanent magnet generator.

If the neutral of the AC output of the generating set disclosed by WO98/28832 were to be connected to the neutral terminal of the generator, the variable voltage three-phase output of the generator would have to be rectified by a half wave rectifier. As a result large and costly inductors would need to be used for the intermediate DC link. Furthermore, there would be a risk that a DC component could be established in the windings of the generator. This could result in torque pulsations due to the DC component of the generator current.

U.S. Pat. No. 4,507,724 discloses a polyphase inverter system which converts DC power developed by a DC source into polyphase AC power to drive a load. The DC source may be a generator and rectifier arrangement which includes control and protection circuitry for operating the generator. In any event, the DC source includes two terminals at first and second voltages and a neutral or common terminal which is at a voltage midway between the first and second voltages. The neutral of the polyphase AC power developed by the inverter is connected to the neutral or common terminal of the DC source.

U.S. Pat. No. 3,775,663 discloses a solid state inverter having an electronic neutral which is an additional single phase inverter operated as a current source or sink to maintain the potential at the neutral terminal at a controlled voltage independent of neutral current flow into and out of the neutral terminal. The inverter has input terminals which are adapted to be connected to a battery, a rectifier energized by an alternating voltage or some other source of unidirectional voltage.

A neutral setting of the AC power output could be generated and regulated by a controlled division of the intermediate DC voltage in which case the rectifier means could be full wave rectifier means. Accordingly a full-wave ripple voltage could be maintained in the DC link so that establishment of a DC component in the windings of the permanent magnet generator could be avoided.

Booster means having an input which is connected to the output of the rectifier means and which are operable to increase the voltage of the rectified output of said rectifier means and thereby to establish the intermediate DC voltage may be provided. The generator means may include respective control means and the voltage sensor means may provide a feedback control signal to the control means of the generator means whereby to effect variation of the variable AC power supply and thereby to counter a tendency of the intermediate DC voltage to vary.

In a preferred embodiment, current sensor means operable to monitor a DC load current caused by connection of a load across the intermediate DC voltage are provided, the current sensor means being operable to emit a signal which is indicative of the monitored DC load current, comparator means being provided for comparing an output signal from the current sensor means with a reference signal and for emitting a speed correction signal which is proportional to the amount by which the signal from the current sensor means exceeds the reference, that output from the comparator means being supplied to the speed control means of the generator means to effect an increase in the speed of the prime mover above that required for the applied load.

The AC power generating system may include brake control means and means responsive to the output of the voltage sensor means that is operable to monitor the intermediate DC voltage whereby to connect the brake control means across the intermediate DC voltage to apply a load thereto when the intermediate DC voltage rises to a certain level. The control means for the inverter means may be operable to increase the frequency of the AC power output in response to an increase in the intermediate DC voltage to a certain high level. The certain high level conveniently is higher than the level at which the brake control means is connected across the intermediate DC voltage.

In order to provide a short term supply of electrical energy when the DC link voltage tends to fall in response to a high load demand electrical energy storage means may be connected across the intermediate DC voltage so as to be charged by the intermediate DC voltage, and bistable switching means and associated control means may be provided, said bistable switching means normally being in one state in which they are operable to make the connection of the electrical energy storage means across the intermediate DC voltage to enable the electrical energy storage means to be charged and to interrupt a connection between the electrical energy storage means and the connection between the output of the rectifier means and the input of the booster means, said bistable switching means being operable in its other state to isolate the electrical energy storage means from the intermediate DC voltage and to make said connection of the electrical energy storage means with the connection between the output of the rectifier means and the input of the booster means whereby to enable discharge of electrical energy from said electrical energy storage means into the connection between the rectifier means and the booster means, said control means associated with the bistable switching means being responsive to the monitored intermediate DC voltage and being operable in response to a fall in said intermediate DC voltage to a certain reference level to switch said bistable switching means from its normal said one state to said other state whereby to discharge electrical energy to augment the rectified output of said rectifier means and thereby to counter the sensed fall in said intermediate DC voltage.

Hence the current to be supplied by the electrical energy storage means to augment the rectified output of the rectifier means need not be as large as it would need to be were it to be supplied to the DC link between the booster means and the inverter means as in the system disclosed in WO98/28832.

Varying the speed of the engine with changes in the load by using a feedback signal derived from monitoring the intermediate DC link voltage as taught by WO98/28832 or by U.S. Pat. No. 5,563,802 or by monitoring either the voltage or current of the variable voltage electrical output of the engine driven generator as taught by WO98/28832 is liable to result in unstable operation such as hunting because the sensed parameter does not respond directly to the external load.

WO98/07224 discloses a power conversion system which responds to an abnormal output condition such as overcurrent by one or more of a number of techniques including reducing engine speed. The system includes a control circuit, an engine, a generator, a controlled rectifier that provides a rectified signal, a power converter and a detector. It is a fault protection system GB-A-2.318,000 discloses a UPS system with a battery and an inverter. It includes a microprocessor controlled monitoring facility which measures the voltages and currents including current fed to a power converter so that necessary adjustments and/or warnings can be made. The output of the inverter is regulated and stabilized.

An object of another aspect of this invention is to provide means for varying the speed of the engine with changes in the external load which operate in a stable manner.

According to that other aspect of the invention, there is provided an AC power generating system including generator means operable to generate a variable voltage AC power supply, rectifier means having an output and being operable to rectify the variable voltage AC power supply, booster means having an input which is connected to the output of the rectifier means and which are operable to increase the voltage of the rectified output of said rectifier means to establish an intermediate DC voltage, a variable speed prime mover drivingly coupled with the generator means, and speed control means operable to control the speed of the prime mover, wherein current sensor means are provided, said current sensor means being operable to monitor a DC load current caused by connection of a load across the intermediate DC voltage, the current sensor means being operable to emit a signal which is indicative of the monitored DC load current, comparator means being provided for comparing an output signal from the current sensor means with a reference signal and for emitting a speed correction signal which is proportional to the amount by which the output signal from the current sensor means exceeds the reference signal, the output from the comparator means being supplied to the speed control means for the generator means to effect an increase in the speed of the variable speed prime mover.

An object of a further aspect of this invention is to provide an improved arrangement for providing a short term supply of electrical energy when the DC link voltage tends to fall in response to a high load demand.

According to the further aspect of this invention there is provided, an AC power generating system including generator means operable to generate a variable voltage AC power supply, rectifier means having an output and operable to rectify the variable voltage AC power supply, booster means having an input which is connected to the output of the rectifier means and which is operable to increase the voltage of the rectified output of said rectifier means and thereby to provide an intermediate DC voltage, inverter means operable to convert the intermediate DC voltage into an AC power output for supplying to an external load, voltage sensor and control means operable to monitor the intermediate DC voltage and to provide a feedback control signal to the generator means whereby to vary the variable voltage AC power supply so as to counter a tendency of the intermediate DC voltage to vary, and electrical energy storage means connected across the intermediate DC voltage so as to be charged by the intermediate DC voltage, wherein bistable switching means and associated control means are provided, said bistable switching means normally being in one state in which they are operable to make the connection of the electrical energy storage means across the intermediate DC voltage to enable the electrical energy storage means to be charged and to interrupt a connection between the electrical energy storage means and a connection between the generator means and the input of the booster means, said bistable switching means being operable in its other state to isolate the electrical energy storage means from the intermediate DC voltage and to make said connection of the electrical energy storage means with the connection between the generator means and the input of the booster means, whereby to enable discharge of electrical energy from said electrical energy storage means into the connection between the generator means and the booster means, said control means associated with the bistable switching means being responsive to the monitored intermediate DC voltage and being operable in response to a fall in said intermediate DC voltage to a certain reference level to switch said bistable means from its normal said one state to said other state whereby to discharge electrical energy to augment the variable voltage AC power supply and thereby to counter the sensed fall in said intermediate DC voltage.

Preferably the connection between the generator means and the input of the booster means is the connection between the rectifier means and the input of the booster means so that the discharged electrical energy augments the rectified output of said rectifier.

A neutral setting of the AC power output could be generated and regulated by a controlled division of the intermediate DC link voltage before it is converted into the AC power output in which case the connection between the electrical energy storage means and the connection between the output of the rectifier means and the input of the booster means need only be made with one of the positive and negative connections between the rectifier means and the booster means so that the number of components required is reduced and cost is saved.

An object of another aspect of this invention is to enable smaller, less expensive inductors to be used in the DC link.

Although generation and regulation of a neutral setting of the AC power output by a controlled division of the voltage of the DC power before that power is converted to AC would enable the use of smaller less expensive inductors, it has the drawback that the capacitors that are connected in series across the DC voltage to effect that division are also connected across the load and therefore must be highly rated so that each of them is capable of withstanding the full load to avoid the danger of capacitor damage in the event of one of them being short circuited. Furthermore, although the power generating system is designed so that the intermediate DC voltage is decoupled or isolated from fluctuations in the current and/or voltage output of the generator so that the apparatus is able to accommodate substantial variations in the output of the generator whilst maintaining the intermediate DC output within desired operating parameters, there are liable to be transient variations in the latter with variations in the load. Hence there may be transient variations in a neutral setting produced by a controlled division of the intermediate DC voltage. As stated above, U.S. Pat. No. 4,507,724 discloses a DC source which develops DC power which is converted into polyphase AC power, the DC source including two terminals at first and second voltages and a neutral or common terminal which is at a voltage midway between the first and second voltages.

Accordingly, an object of another aspect of this invention is to enable the use of full wave rectification whilst providing a reliably constant neutral setting which will serve as a good reference potential and which will reduce the need for expensive, highly-rated capacitors.

According to yet another aspect of this invention there is provided an AC power generating system including variable voltage AC power supply generator means, rectifier means having an output and operable to rectify the variable voltage AC power supply to establish an intermediate DC voltage, inverter means which are operable to convert the intermediate DC voltage into an AC power output, voltage sensor means operable to monitor the intermediate DC voltage and control means responsive to an output from the voltage sensor means and operable to maintain the intermediate DC voltage at one level, wherein the generator means is operable to generate two variable voltage AC power supplies, the rectifier means comprise two full-wave rectifiers, each full-wave rectifier being operable to rectify a respective one of the two variable voltage AC power supplies and each being connected on one side to a neutral terminal and having an output voltage terminal on its other side, the output voltage terminal of one of the full-wave rectifiers being positive and the output voltage terminal of the other full-wave rectifier being negative such that the two variable voltage AC power supplies are severally rectified to produce a positive and a negative potential respectively which together comprise the intermediate DC voltage, the voltage sensor means comprising two voltage sensors severally responsive to a respective one of the positive and negative output potentials of the two full-wave rectifiers and the control means comprising two controllers severally operable to maintain each of those positive and negative potentials at a certain level whereby to maintain the intermediate DC voltage at said one level.

Preferably there are two booster circuits, each connected between a respective one of the output voltage terminals of the two full-wave rectifiers and the neutral terminal and each operable to increase the voltage of the respective output potential and thus to increase the intermediate DC voltage, each of the controllers being operatively associated with the respective one of the booster circuits.

The generator means which may be a permanent magnet generator, may be driven by a variable speed prime mover which may be provided with speed control means operable to control the speed of the prime mover. Preferably current sensor means operable to monitor a DC load current caused by connection of a load across the intermediate DC voltage are provided, the current sensor means being operable to emit a signal which is indicative of the monitored DC load current, comparator means being provided for comparing an output signal from the current sensor means with a reference signal and for emitting a speed correction signal which is proportional to the amount by which the signal from the current sensor means exceeds the reference, that speed correction signal being supplied to the speed control means for the generator as a feed back control signal whereby to effect variation of the variable AC power supply and thereby to counter any tendency of the intermediate voltage to vary.

The AC power generating system may include brake control means and means responsive to the output of the two voltage sensors that are operable to monitor the positive and negative output potentials whereby to connect the brake control means across the intermediate DC voltage to apply a load thereto when the potential difference between the monitored positive and negative potentials rises to a certain level. Preferably one pair of capacitors are connected in parallel between the positive output potential and the neutral terminal, another pair of capacitors is connected in parallel between the negative output potential and the neutral terminal and the brake control means are connected across the positive and negative output potentials between the capacitors of each pair. Preferably the current sensor means that are operable to monitor the DC load current caused by connection of a load across the intermediate DC voltage are connected in either the positive or the negative connection between the brake control means and the capacitors of each pair that are remote from the two full-wave rectifiers and that are nearer to the inverter means.

The power supply system disclosed in U.S. Pat. No. 5,563,802 discussed above has microprocessor control means for integrating the battery and the engine/generator according to a predetermined control logic. The microprocessor monitors various parameters. It shuts down the engine/generator if certain parameters are exceeded. For example:

1) the speed of the engine/generator exceeds a predetermined limit (overspeed controlling);
2) the output of the inverter circuitry exceeds a predetermined limit (called chopper overvoltage);
3) the voltage output of the engine/generator exceeds a predetermined limit (called engine generator overvoltage); and
4) the boost voltage at the input of the inverter circuitry exceeds a predetermined limit (called booster overvoltage).

The microprocessor also activates the battery voltage booster upon a current sensor detecting a transient condition caused by addition of electrical load so as to overcome undershoots and activates charging of the battery upon the current sensor detecting a transient condition caused by deletion of an electrical load so as to overcome overshoots.

U.S. Pat. No. 5,606,244 discloses an AC power generating system which includes an engine driven generator, a rectifier, a booster which boosts the rectified output of the engine/generator if it is less than a predetermined value so as to generate a stable DC voltage at a suitable level which it feeds it to an inverter to produce an AC output. The voltage fed to the inverter is monitored and used as a feedback signal for the booster. The system includes electronic protection against over current, over load, short circuit and thermal over load conditions.

As stated above, U.S. Pat. No. 5,198,698 discloses an auxiliary power supply which supplies DC voltage to a consuming device such as a UPS system. G-A-2,318,000 and U.S. Pat. No. 5,811,960 disclose UPS systems, the latter being a battery-less system.

According to a further aspect of this invention, there is provided a method of operating an AC power generating system including the steps of:

(i) operating a variable speed prime mover driven generator to generate a variable voltage AC power supply;
(ii) rectifying the, variable voltage AC power supply to establish an intermediate DC voltage;
(iii) controlling the intermediate DC voltage to maintain it at a substantially constant level;
(iv) operating an inverter to convert the intermediate DC voltage into an AC power-output;
(v) monitoring the intermediate DC voltage;
(vi) comparing the intermediate DC voltage with a first reference voltage which is lower than the substantially constant level; and
(vii) controlling operation of the prime mover driven generator by feedback control so as to increase its speed when the monitored intermediate DC voltage falls to the level of the first reference voltage whereby to restore the intermediate DC voltage to said substantially constant level; wherein
(viii) the intermediate DC voltage is also compared with a second reference voltage which is lower than said first reference voltage, and
(ix) operation of the inverter is controlled so as to reduce the voltage and/or frequency of the AC power output when the monitored intermediate DC voltage falls to the level of the second reference voltage whereby to provide a transient off-loading effect which assists restoration of the intermediate DC voltage to said substantially constant level.

Preferably the method of operating an AC power generating system includes the further steps of:

a) monitoring a DC load current which results from connection of a load across the intermediate DC voltage;
b) comparing the monitored DC load current with a certain current reference level; and
c) further controlling operation of the prime mover driven generator by feedback control when the monitored DC load current exceeds the certain current reference level whereby to further increase the speed of the prime mover driven generator by an amount which is proportional to the amount by which the monitored DC load current exceeds the certain current level.

Operation of the inverter may further be controlled so as to increase the frequency of the AC power supply when the monitored DC voltage rises to the level of a third reference voltage. A brake controller may be connected across the monitored DC voltage to apply a load thereto when the monitored DC voltage rises to a certain voltage level. Conveniently the third reference voltage is higher than said certain voltage level.

In order to convert a DC voltage into a multiphase AC power output, it is usual to provide a pair of transistors for each phase, that pair of transistors being arranged so that the collector of one of them is connected to a positive of the DC voltage, the emitter of the other is connected to a negative of the DC voltage and the emitter of said one transistor is connected to the collector of said other transistor. The connection between the two transistors for each phase is connected through an inductance, or choke of an LC output filter to an AC power output terminal for the respective phase. Operation of the transistors is controlled by a controller which generates a pulse width modulated drive to the base of the respective transistor to control its operation. The basis of this control involves operating the transistors so as to connect the positive and negative potentials of the DC voltage alternately to the respective AC power output terminal through the inductance or choke of the LC output filter that smoothes it. This converter arrangement is adapted so as to minimise the number of power electronic devices and microprocessor controllers that are used. However the high frequency switching of the voltage between positive and negative potentials results in the production of a high ripple current. This ripple current is passed through the transistors, inductances or chokes, the LC output filter capacitors and the capacitors that are connected across the DC voltage. As a result it is necessary to employ high capacity DC capacitors in order to cater for the high ripple current. Furthermore ripple currents which oscillate between positive and negative current values result in bi-directional power flow between the capacitors that are connected across the DC voltage and the capacitors of the LC output filters.

An object of another aspect of this invention is to provide an arrangement for converting a DC voltage to an AC power output in which lower ripple currents are generated.

According to yet another aspect of this invention there is provided a method of converting a DC voltage having a positive and negative level of electrical potential into an AC power output in which the positive and negative levels of electrical potential are connected to an AC power output terminal alternately, wherein each connection of one of the positive and negative levels of electrical potential to the output terminal is separated in time from a connection of the other of the positive and negative levels of the electrical potential to the output terminal by an intermediate period of zero voltage.

Where the source of each of the positive and negative potentials of DC voltage is a respective charged capacitor and the positive and negative levels of electrical potential are connected alternately to the AC power output terminal through an output filter, both sides of the output filter may be connected to neutral for said intervening periods.

According to a further aspect of this invention there is provided a DC to AC converter including a first source of electrical energy operable to be charged with a positive DC potential, a second source of electrical energy operable to be charged with a negative DC potential, first bistable switching means operable in one state to connect the first electrical energy source to an AC power output terminal through an inductor means of an output filter means and to break that connection in its other state, second bistable switching means operable in one state to connect the second electrical energy source to the AC power output terminal through said inductor means and to break that connection in its other state, third bistable switching means operable in one state to connect said inductor means to neutral and to break that connection in its other state, and control means operable to control operation of said first, said second and said third bistable switching means so that said first and said second bistable switching means are switched to their said one state alternately and are in their said other state when the other of said first and second bistable switching means are in their said one state and said third bistable switching means is switched to its said one state whilst said first and second bistable switching means are both switched to their said other state between each alternate switching of said first and second bistable switching means to their said one state so that the positive and negative levels of electrical potential with which said first and second electrical energy sources are charged when said converter is operated are connected to the AC power output terminal alternately and each connection of the one of the positive and negative levels of electrical potential to the output terminal is separated in time from a connection of the other of the positive and negative levels of electrical potential to the output terminal by an intervening period of zero voltage.

Preferably the output filter means includes a third chargeable source of electrical energy which is connected on one side to the inductor means and on its other side to neutral, the third bistable switching means being operable to connect the other side of the inductor means to neutral when in its said one state.

In a preferred embodiment of this invention the DC to AC converter is the inverter means of an AC power generating system which includes variable voltage AC power supply generating means, rectifier means having an output and operable to rectify the variable voltage AC power supply to establish an intermediate DC voltage, the inverter means being operable to convert the intermediate DC voltage into the AC power output, there being voltage sensor means operable to monitor the intermediate DC voltage and control means responsive to an output of the voltage sensor means and operable to maintain the intermediate DC voltage at one level. Preferably the generator means is operable to generate two variable voltage AC power supplies and two full wave rectifiers are provided, each being operable to rectify a respective one of the two variable voltage AC power supplies and each being connected on one side to a neutral terminal and having an output terminal on its other side, the output terminal of one of the fullwave rectifiers being positive and the output terminal of the other fullwave rectifier being negative such that the two variable voltage AC power supplies are rectified to produce a positive and a negative potential respectively which together comprise the intermediate DC voltage and which are respectively connected across the first and second electrical energy storage means, there being voltage sensor means severally responsive to a respective one of the positive and negative output potentials of the two fullwave rectifiers and control means operable to maintain each of those positive and negative potentials at a certain level whereby to maintain the intermediate DC voltage at one level.

Preferably there are two booster circuits, each connected between a respective one of the output terminals of the two fullwave rectifiers and the neutral terminal and each operable to boost the respective one of the output electrical potentials, each of the control means being operatively associated with a respective one of the booster circuits.

According to yet another aspect of this invention there is provided a method of operating an AC power generating system of the kind which includes an engine driven generator which provides a variable voltage electrical output, rectifier means operable to rectify the variable voltage electrical output, booster means operable to boost the voltage of the variable voltage electrical output and thereby to provide an intermediate DC voltage, inverter means which are operable to convert the intermediate DC voltage into an AC power output, means operable to maintain the intermediate DC voltage at one level up to a predetermined speed of the engine driven generator which is less than the maximum speed thereof, wherein the means operable to maintain the intermediate DC voltage at said one level is disenabled when the speed of the engine driven generator rises to at least said predetermined speed and the speed of the engine driven generator and the intermediate DC voltage are allowed to rise so that, when the engine driven generator is running at maximum speed, the AC power output is allowed to increase until a balance is achieved.

An electric power generating set which automatically varies its speed to match load variations at any time in which this invention is embodied and several modifications of that generating set will be described now by way of example with reference to accompanying drawings of which:

FIGS. 1A and 1B together comprise a circuit diagram of the generating set, the junction between the two parts of the circuit diagram being shown by a chain dotted line in each of FIGS. 1A and 1B;

Figure 1A:
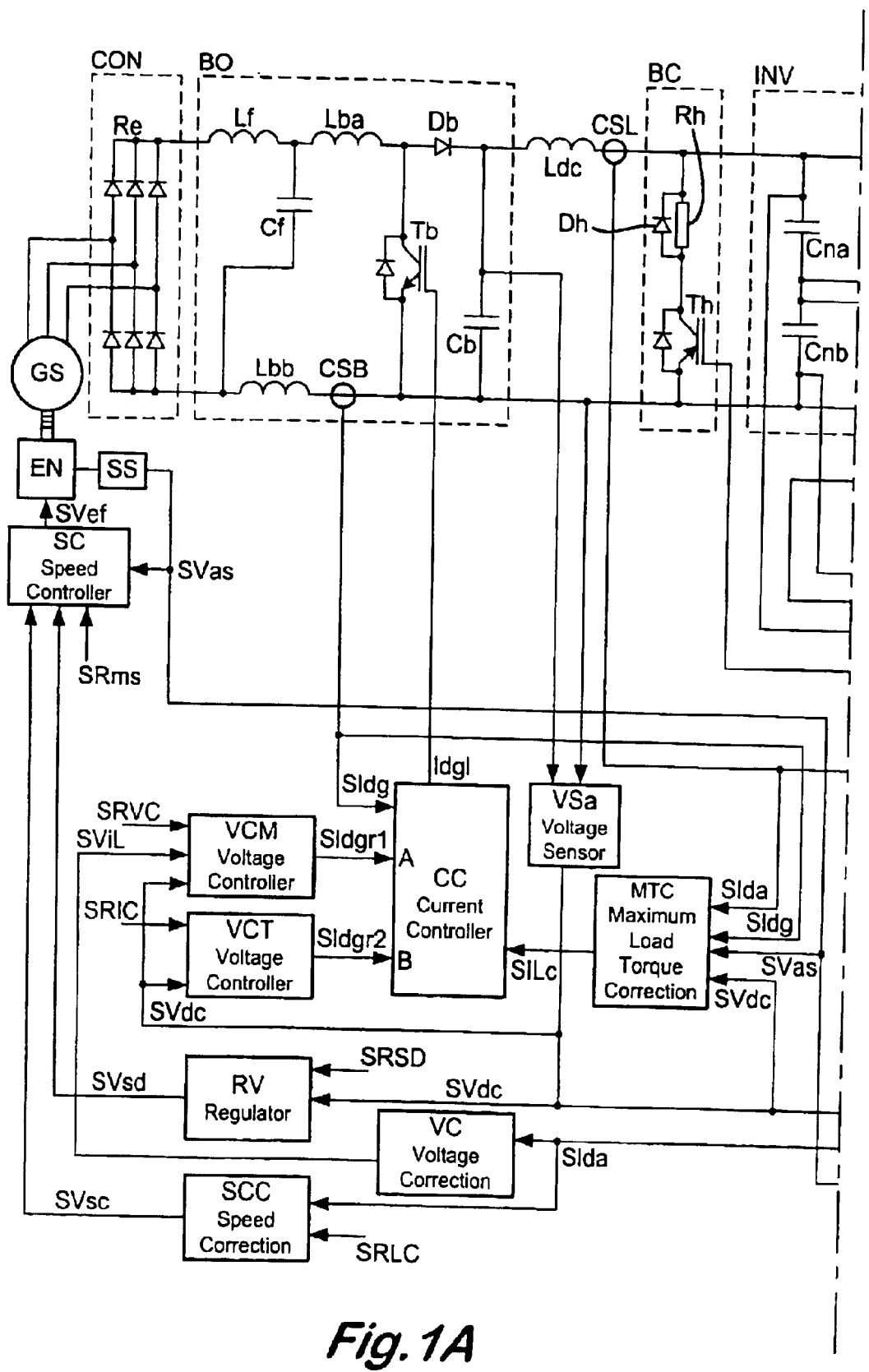
Figure 1B:
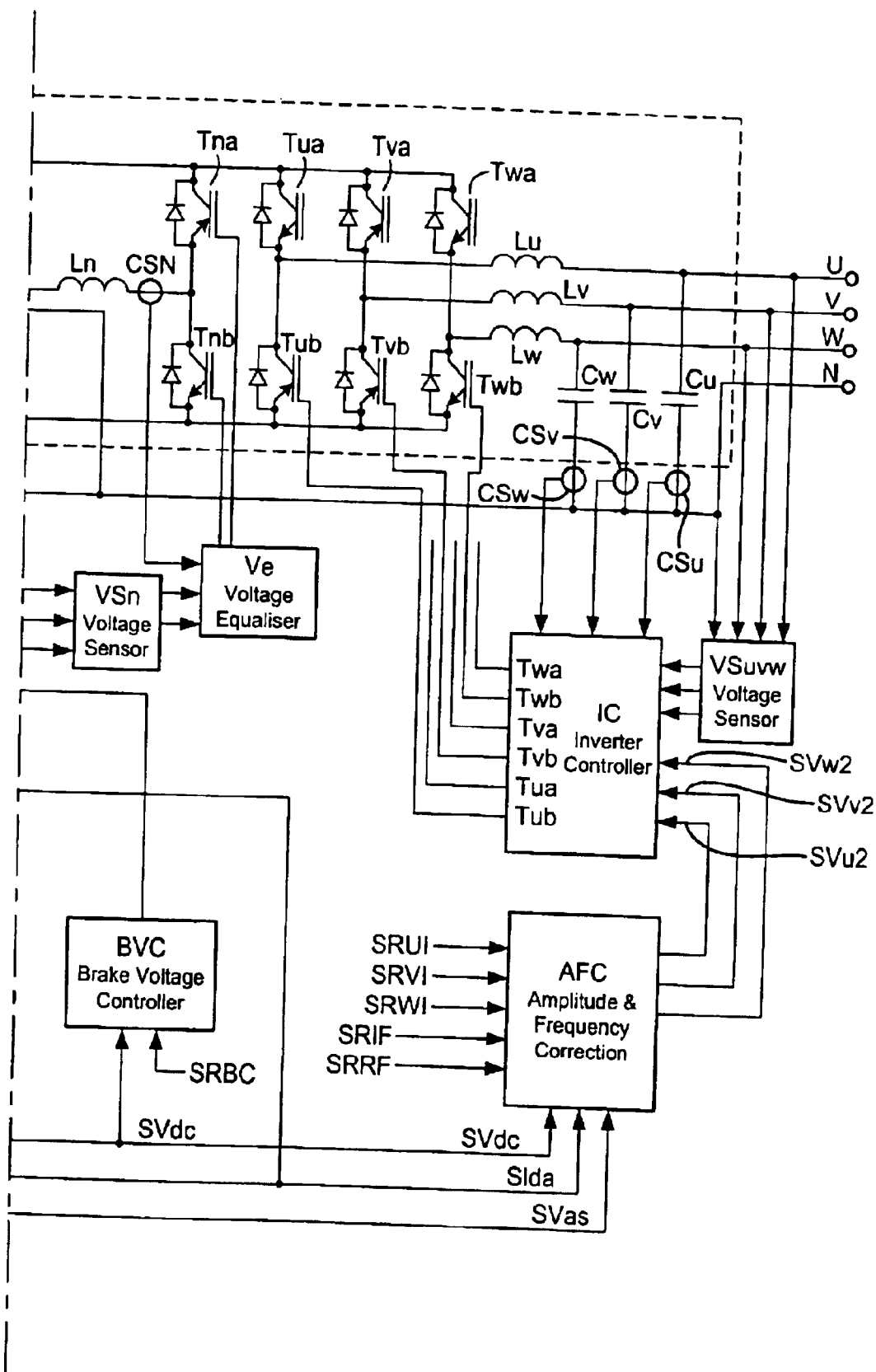
Figure 7A:
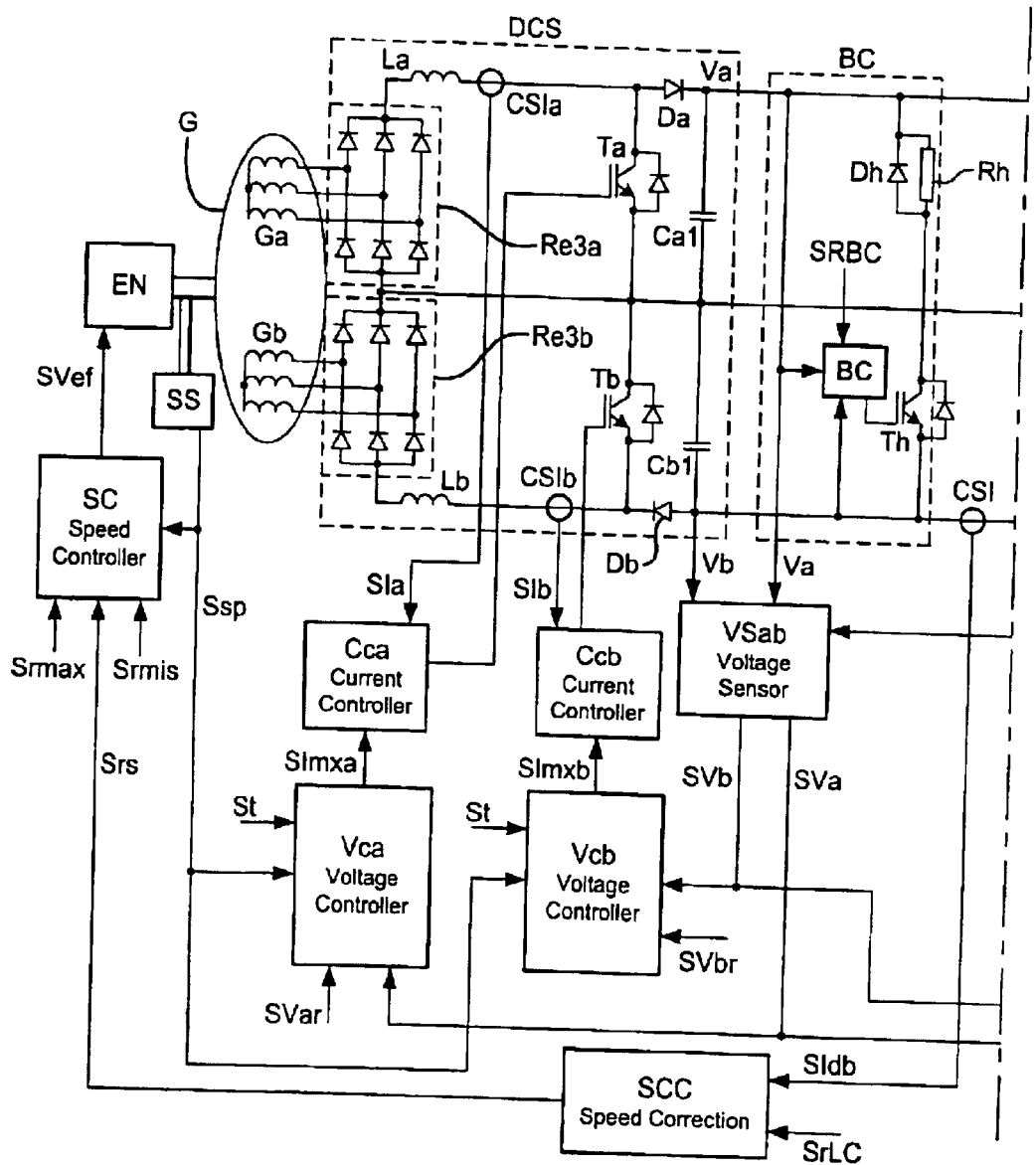
Figure 7B:
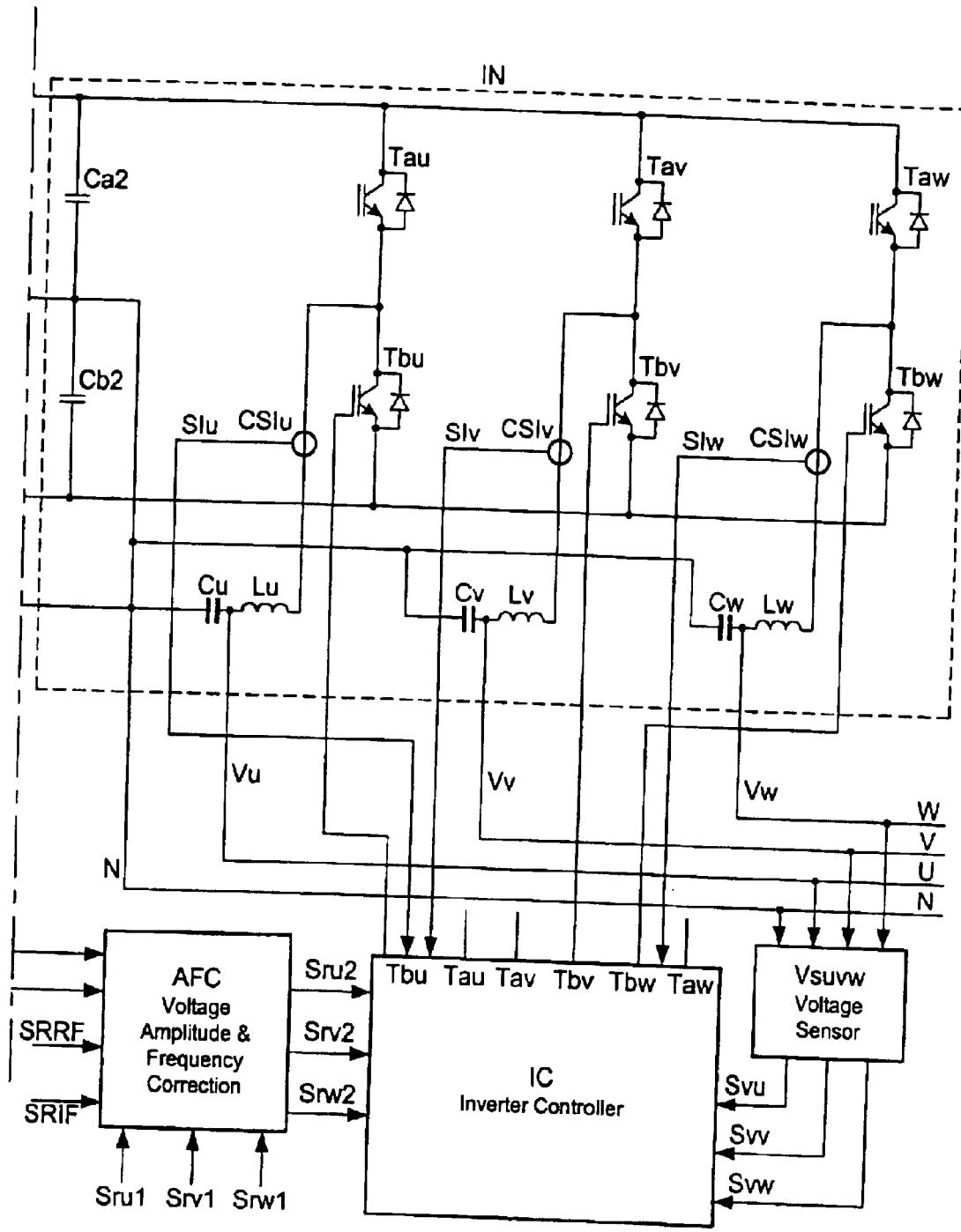
Figure 8:
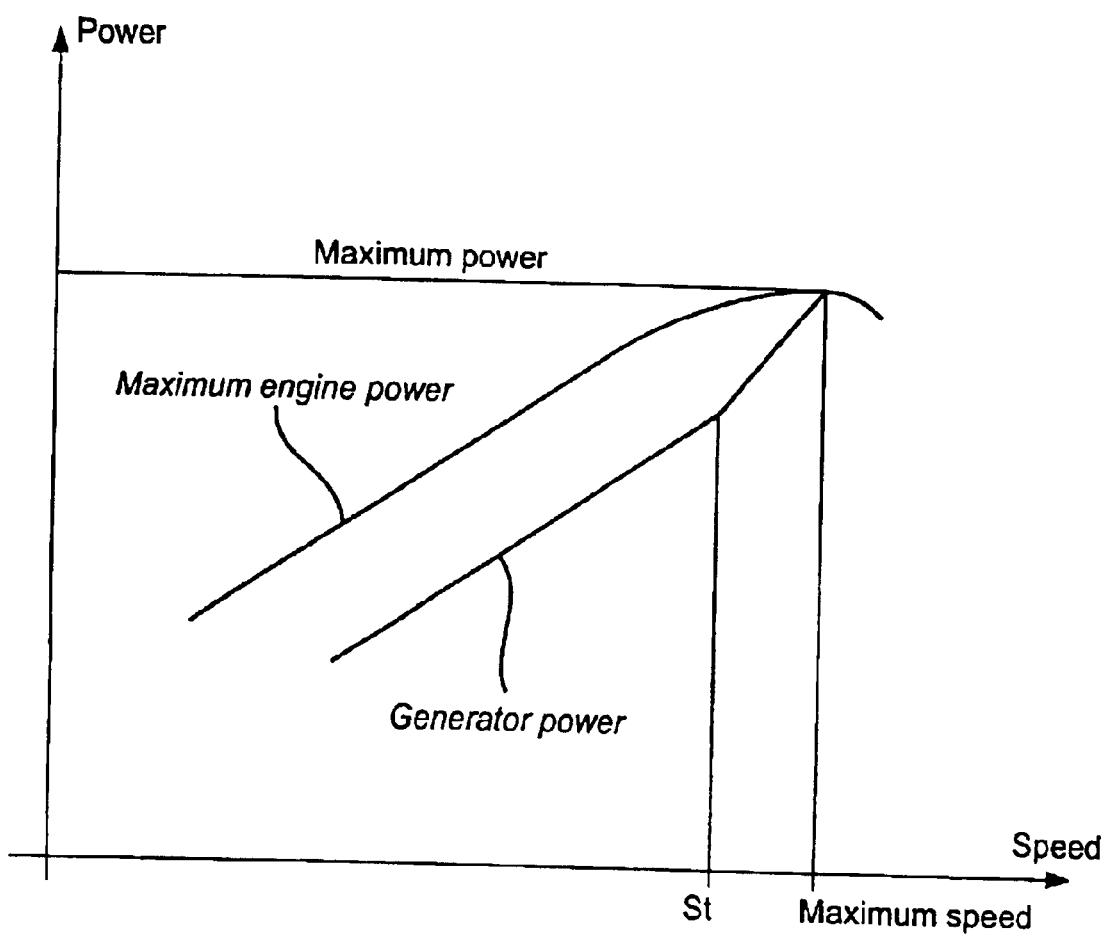
Figure 9A:
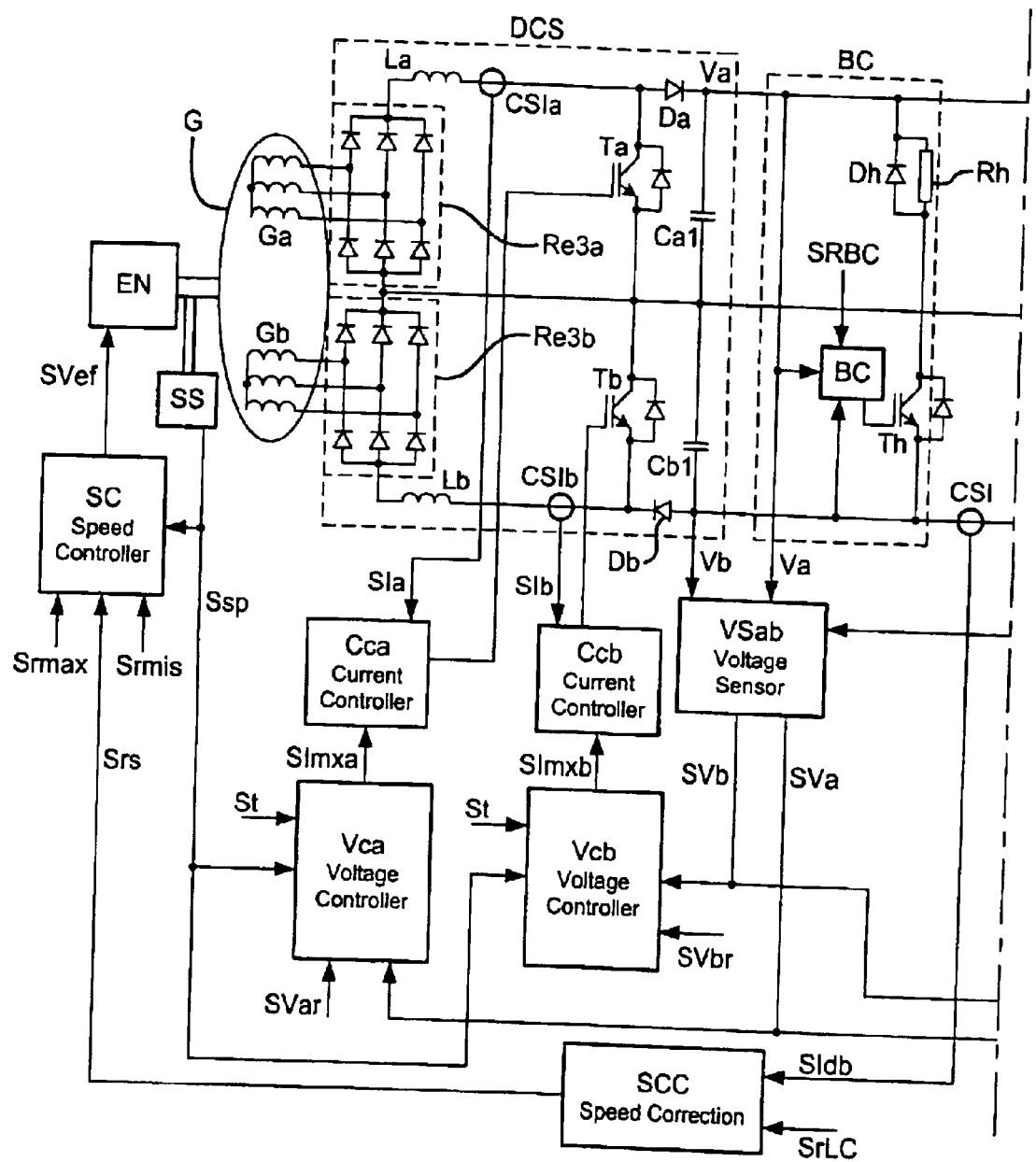
Figure 9B:
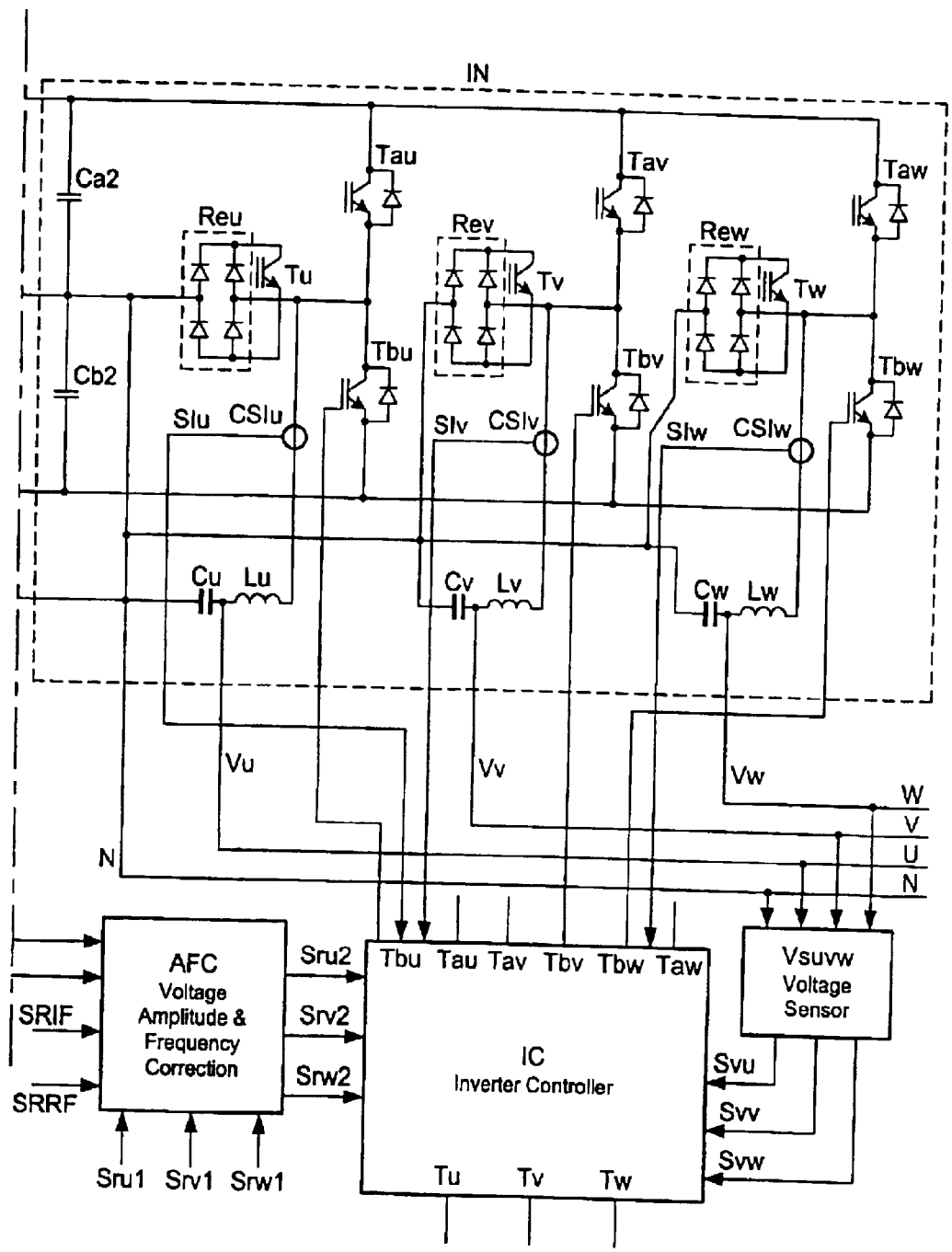

FIGS. 7A and 7B together comprise a circuit diagram of a further modified form of the generating set illustrated in FIGS. 1A and 1B, certain details of the circuit diagram shown in FIGS. 1A and 1B being omitted for the sake of convenience, the junction between the two parts of the circuit diagram being shown by a chain dotted line in FIGS. 7A and 7B;

FIG. 8 is an illustration of a power control strategy for the generating set illustrated in FIGS. 7A and 7B when operated at maximum engine speed, and FIGS. 9A and 9B together comprise a circuit diagram of an AC power generating system according to another embodiment of this invention, the junction between the two parts of the circuit diagram being shown by a chain dotted line in each of FIGS. 9A and 9B.

FIGS. 1A and 1B show the components of an electrical power generating set in diagrammatic form. The generating set includes a Diesel Engine EN which is mechanically coupled with a rotor of a permanent magnet power generator GS whereby to rotate the rotor relative to a stator of the generator GS and thereby to generate a three-phase variable frequency and voltage AC output from the generator GS.

The engine EN has an electronic speed sensor SS, a speed controller SC and an electronically controlled fuel injection system. The speed sensor SS produces an output signal SVas which is indicative of the sensed engine speed. The speed controller SC has four input ports. One of those input ports receives a minimum speed reference signal SRms. Another of those input ports receives the actual speed signal SVas which is emitted by the speed sensor SS. A third of the input ports of the speed controller SC receives a speed demand signal SVsd and the fourth input port receives a speed correction signal SVsc. The signals SVsd and SVsc received by the latter two of the input ports of the speed controller SC are generated by operation of the generating set as is described below. The speed controller SC controls operation of the fuel injection system of the engine EN in response to those four input signals in order to control the speed of the engine EN and maintain it above the minimum speed and at the demanded level which is related to the sum of the three signals SRms, SVsd and SVsc.

The three phase variable frequency and voltage output of the generator GS is rectified by a full wave bridge rectifier Re which has a pair of output terminals.

A voltage booster circuit BO is connected across the output terminals of the bridge rectifier Re. The booster circuit BO includes a filter comprising an inductor Lf and a capacitor Cf. One side of the inductor Lf is connected to the positive output terminal of the bridge rectifier Re. The other side of the inductor Lf is connected to one side of the capacitor Cf and to one side of another inductor Lba. The other side of the capacitor Cf is connected to the negative output terminal of the bridge rectifier Re. The output voltage across the capacitor Cf is a filtered version of the output voltage from the bridge rectifier Re. The other side of the other inductor Lba is connected to the collector of a transistor Tb and to the anode of a diode Db. A third inductor Lbb is connected in series between the negative output terminal of the bridge rectifier Re and a current sensor CSB. The other side of the current sensor CSB is connected to the emitter of the transistor Tb and to one side of a capacitor Cb. The cathode of the diode Db is connected to the other side of the capacitor Cb so that current normally flows to the capacitor Cb. The voltage across the capacitor Cf is boosted by the combined effect of the inductors Lba and Lbb with the switching action of the parallel connected transistor Tb and the series diode Db. The output of the booster circuit BO is the voltage across the capacitor Cb which is maintained substantially constant and forms the DC link voltage.

A voltage sensor VSa is connected across the capacitor Cb and thereby is operable to monitor the DC link voltage. The voltage sensor VSa emits an output signal SVdc which is an indication of the DC link voltage at any one instant. The current sensor CSB emits an output signal Sldg. A second current sensor CSL measures current flow through an intermediate DC link inductor Ldc which has one side connected to the positive output terminal of the booster circuit BO which is connected to the cathode of the diode Db and to the capacitor Cb across which the DC link voltage is maintained. The second current sensor CSL emits a signal Slda.

A voltage controller VCM has three input ports. Another voltage controller VCT has two input ports. Each of the voltage controllers VCM and VCT has one output. One of the input ports of each of the voltage controllers VCM and VCT is connected to the output of the voltage sensor VSa. Another input port of the voltage controller VCM and the other input port of the voltage controller VCT respectively receives a respective reference signal SRVC, SRIC.

A current controller CC has its output connected to the base of the transistor Tb and has four input ports. The current controller CC is designed to act on the higher of the signals received at two of its input ports A and B. The output of each of the voltage controllers VCM and VCT is connected to a respective one A, B of the two input ports A and B of the current controller CC. One of the other two input ports of the current controller CC is connected to the output of the current sensor CSB so as to receive the signal Sldg. The fourth input port of the current controller CC receives a signal SILc from the output of a maximum load torque correction controller MTC. The controller MTC provides a profile of available, or permissible generator currents at different speeds and loading conditions, and operates to select the appropriate one as the output signal SILc. The controller MTC has four input ports.

One of the input ports of the controller MTC receives the signal Sldg from the current sensor CSB of the booster circuit BO. Another of the input ports of the controller MTC receives the actual speed signal SVas produced by the engine speed sensor SS. A third of the input ports of the controller MTC receives the signal Slda from the other current sensor CSL which measures the DC link current. The fourth input port of the controller MTC receives the output signal SVdc of the voltage sensor VSa which monitors the DC link voltage that is maintained across the capacitor Cb.

A speed correction circuit SCC has two inputs and an output from which the speed correction signal SVsc is fed to the speed controller SC. One of the inputs of the speed correction circuit SCC receives the current signal Slda from the current sensor CSL. The other input of the speed correction circuit SCC receives a reference signal SRLC.

The current signal Slda from the current sensor CSL is also fed to a voltage correction circuit VC which has a single output. The signal SViL emitted by the voltage correction circuit VC is fed to the third input of the voltage controller VCM. A regulator circuit RV which generates the signal SVsd has two inputs. One of those inputs receives the signal SVdc from the voltage sensor VSa that monitors the DC link voltage across the capacitor Cb. The other of those inputs receives a reference signal SRSD.

A brake controller BC is connected across the DC link voltage. The brake controller BC includes a resistor Rh in series with a transistor Th, the resistor Rh being connected to the collector of the transistor Th. A reverse biassed diode DH is connected in parallel with the resistor Rh. The base of the transistor Th is connected to the output of a brake voltage controller BVC which has two inputs. One of those inputs is connected to the output of the voltage sensor VSa so as to receive the signal SVdc. A reference signal SRBC is applied to the other input of the brake voltage controller BVC.

A three phase DC/AC inverter INV has a power output terminal U, V, W for each phase and a neutral terminal N. The inverter INV is connected across the DC link voltage. The inverter INV includes a pair of capacitors Cna and Cnb which are connected in series across the DC link voltage. One end terminal of an inductor Ln is connected to the series connection between the two capacitors Cna and Cnb which is also connected to the neutral terminal N by a neutral line. The other terminal of the inductor Ln is connected through a current sensor CSN to the emitter of one transistor Tna and to the collector of another transistor Tnb. The two transistors Tna and Tnb are connected in series across the DC link voltage.

The AC power output for each phase of the three phase output of the inverter INV is produced by operation of a respective one of three other pairs of transistors Tua and Tub; Tva and Tvb; Twa and Twb which are connected in parallel with one another and with the pair of transistors Tna and Tnb. The transistors of each pair Tua and Tub; Tva and Tvb; Twa and Twb are series connected by having the emitter of one of that pair connected to the collector of the other of that pair, the series connection between the transistors of each pair Tua and Tub, Tva and Tvb, Twa and Twb being connected to the respective power output terminal U, V, W through a respective inductor Lu, Lv, Lw. Each of the inductors Lu, Lv and Lw is the inductor of an LC filter which is provided for each phase. The capacitor Cu, Cv, Cw of each LC filter is connected between the output line for the respective phase and the neutral line through a respective current sensor CSu, CSv and CSw.

Each of the transistors Tb, Ta, Tna, Tnb, Tua, Tub, Tva, Tvb, Twa and Twb is an insulated Gate Bipolar Transistor (IGBT) and has an inverse parallel diode connected across its emitter and collector junctions (diode cathode to collector, diode anode to emitter). Other forms of transistor could be used. Each of the current sensors CSB, CSL and CSN is a DC current transducer.

A voltage sensor VSn senses the instantaneous division of voltage between the pair of capacitors Cna and Cnb that are connected across the DC link voltage. The voltage sensor VSn has three inputs and two outputs. A first of those inputs is connected to the positive terminal of the capacitor Cna. A second of those inputs is connected to the negative terminal of the capacitor Cnb. The third input is connected to the neutral terminal N. The voltage sensor VSn has two outputs, each of which is connected to a respective input of a voltage equaliser Ve. The output of the current sensor CSN is connected to a third input of the voltage equaliser Ve. Each output of the voltage equaliser Ve is connected to the base of a respective one of the transistors Tna and Tnb. The voltage equaliser Ve responds to the sensed division of voltage across the capacitors Cna and Cnb and the sensed current which has been smoothed by the inductor Ln by controlling operation of the two transistors Tna and Tnb as switches so as to control the neutral point of the AC output voltage of each phase and thereby to maintain symmetry of the output voltage under un-balanced load conditions.

The reference levels for the required value of output frequency and voltage are provided by an Amplitude and Frequency Correction circuit AFC which has eight inputs and three outputs. The output signal SVdc from the voltage sensor VSa, the actual sensed speed signal SVas from the speed sensor SS and the output Slda from the current sensor CSL that senses the DC link current are each connected to a respective one of the inputs of the Amplitude and Frequency Correction circuit AFC. Reference signals SRUI, SRVI, SRWI, SRIF and SRRF are fed to respective ones of the five other inputs to the Amplitude and Frequency Correction circuit AFC. The output signals emitted from the three outputs of the Amplitude and Frequency Correction circuit AFC are SVw2, SVv2 and SVu2.

A voltage sensor VSuvw senses the output voltage of each of the AC power outputs for each phase U, V and W with respect to the neutral line N. The voltage sensor VSuvw has three outputs which are fed to respective inputs of an Inverter controller IC which also receives the three output signals SVu2, SVv2 and SVw2 from the Amplitude and Frequency Correction circuit AFC at respective ones of three other inputs and the three output signals from the current sensors CSu, CSv and CSw at respective ones of three further inputs.

The inverter controller IC uses the capacitor currents measured by the current sensors CSu, CSv and CSw to produce a phase lead characteristic for fast response and optimised damping. The Inverter controller IC has six outputs Tua, Tub, Tva, Tvb, Twa and Twb which are each connected to the base of a respective one of the output transistors Tua, Tub, Tva, Tvb, Twa and Twb. The inverter controller IC thereby operates to control operation of the transistors Tua, Tub, Tva, Tvb, Twa and Twb of the inverter INV by pulse width modulation.

The DC/AC pulse width modulated inverter INV produces a sinusoidal three phase voltage for symmetrical and non-symmetrical loads. The output voltage of each phase U, V, W is individually modulated by the Inverter Controller IC and the neutral point is controlled by the voltage equalizer Ve to maintain optimum symmetry of the output voltage under un-balanced load conditions.

At no load, steady state operation of the generating set, the engine EN will be controlled at minimum speed as set by reference SRms on the Speed Controller SC. The control system will hold the DC link voltage across the capacitor Cb constant. This is achieved by operation of the voltage controller VCM, the signal reference SRVC, the signal voltage SViL from the Voltage Correction Circuit VC and the DC link voltage feedback signal SVdc. Any difference between the sum of the reference signal SRVC and the signal voltage SViL on the one hand and the feedback signal SVdc on the other hand will produce an error voltage on the output from the voltage controller VCM. The output from the voltage controller VCM provides the demand signal Sldgr1 for the input A of the current controller CC. The current controller CC acts on that signal Sldgr1 and ignores the output Sldgr2 from the voltage controller VCT if the latter is low because SVdc>SRIC. The feedback signal for the current controller CC is Sldg from the current sensor CSB. The output from the current controller CC provides a pulse width modulated drive to the booster transistor Tb which sources a controlled current to maintain the voltage across the capacitor Cb constant, as regulated by the voltage controller VCM.

The output SVsc of the speed correction circuit SCC will increase speed demand in a proportional manner whenever the feedback signal Slda from the current sensor CSL exceeds the reference signal SRLC. This speed compensation is included to avoid a 'Dead Corner' or flat response area of the control system when high current is demanded at minimum speed. The time taken to produce the reference signal SVsc when Slda>SRLC is short which is advantageous because the engine speed increases more quickly in reaction to the demand for high current at low speed than would the feedback speed demand signal SVsd that is produced in response to the consequent fall in the intermediate load voltage across the capacitor Cb. This is because the load current increases quickly in response to the demand for high current at low speed so that the speed correction signal SVsc does likewise whereas the voltage across the capacitor Cb falls slowly so that the signal SVsd falls slowly as well which results in a slow rise in the reference signal SVsd.

A proportional increase in the intermediate DC link voltage is provided by the Voltage Correction circuit VC by adding an additional demand proportional to the DC link current, namely the output signal SViL that is fed to the voltage controller VCM. This improves the ability of the inverter INV to maintain the output voltage at a higher level than the reference level SRVC at high loads.

Figure 2:
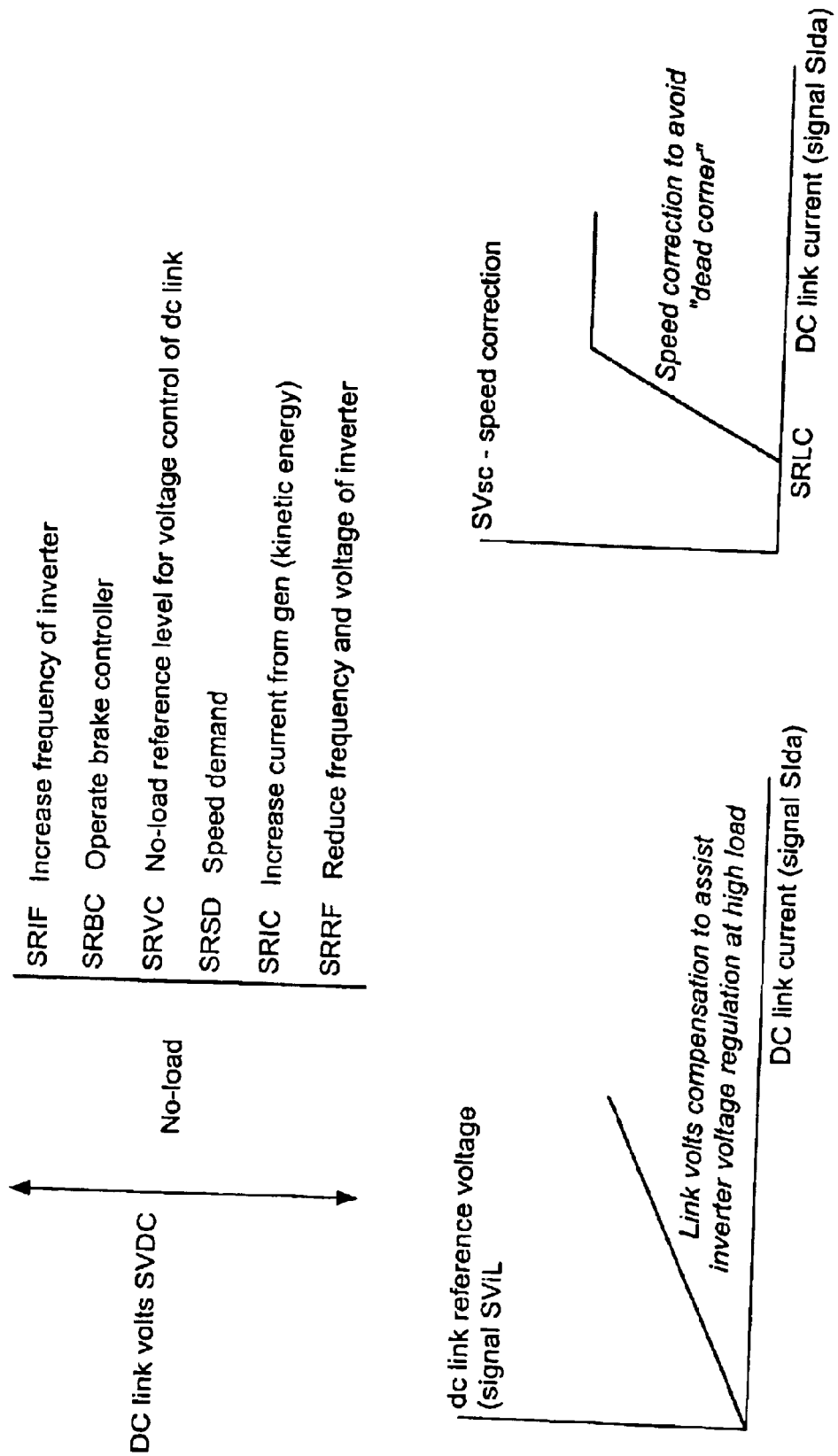
FIG. 2 illustrates the control strategy of the generating set illustrated in FIGS. 1A and 1B.

As load is applied to the output of the inverter INV, the DC link voltage across the capacitor Cb will vary transiently before corrective action is taken. No such corrective action is needed or taken during normal load operating conditions. The amount of voltage variation that occurs due to abnormal loading conditions determines which of the various electronic controllers of the generating set operate. FIG. 2 shows that the DC signal reference levels for the various controllers arc in the following order, starting with SRVC (Voltage control), the no-load reference level for voltage control of the DC link, each control being brought into operation when its signal reference level is reached during operation of the generating set. The exact settings of the reference levels is determined during tuning and optimization of the control system of the generating set.

If the DC Link voltage increases SRBC (Brake Controller) is the first control to be brought into operation and it does so to apply a controlled resistive load to the DC link if SVdc>SRBC. SRIF (Increase Frequency) is brought into operation, to increase the frequency of the output of the inverter INV if SVdc>SRIF.

SRSD (Speed demand), is the first control to be brought into operation if the DC link voltage is reduced and it does so to increase speed of the engine EN if SVdc<SRSD. SRIC (Increase current) is brought into operation for a short time to use kinetic energy to increase current from the generator GS if SVdc<SRIC and if the feedback signal Slda from the current sensor CSL exceeds the reference signal SRLC. SRRF (Reduce frequency) is brought into operation, to reduce the frequency and voltage of the inverter output if SVdc<SRRF.

When a step load is applied to the output of the inverter INV, the voltage across the capacitor Cb will vary transiently from its controlled constant value. The DC link voltage feedback signal SVdc decreases and the output from the voltage controller VCM, through operation of the current controller CC, will demand more current to maintain the voltage across the capacitor Cb constant. The current limit (or maximum value) demanded by the current controller CC is determined by the maximum load torque correction circuit MTC which provides the appropriate output signal SILc from its profile of available, or permissible generator currents at different speeds and loading conditions.

If the applied step load causes a current limit condition in the current controller CC, the DC link feedback voltage SVdc will fall below the reference level SRSD. The voltage regulator RV will operate as well as the voltage controller VCM. The output SVsd from the regulator Rv will actuate the speed controller SC to demand an increase in engine speed which will eventually result in a greater voltage output from the generator GS. The combined action of the voltage controller VCM, the voltage correction circuit VC, the speed correction circuit SCC, the regulator RV and the speed controller SC will restore the DC link voltage across the capacitor Cb.

If the applied step load causes the feedback voltage signal SVdc to fall below the reference signal SRIC, the voltage controller VCT will also operate to produce a higher output Sldgr2 than the output Sldgr1 from the voltage controller VCM. Signal Sldgr 2, which will be the difference between the signals SRIC and SVdc, will be produced and will cause an increased demand for current from the generator GS. That increase will be supplied mainly by kinetic energy from the rotating parts of the generator GS. The speed correction circuit SCC will operate to increase a speed demand. The regulator RV will also operate to provide increased speed demand. Again the combined action of the controllers will restore the voltage across the capacitor Cb.

If the applied step load caused the feedback voltage SVdc falls below the reference level SRRF, the Amplitude and Frequency Correction circuit AFC will also operate. This produces a reduction in the voltage and frequency of the output of the inverter INV to provide a transient off loading effect which will restore the voltage across the capacitor Cb.

The brake controller BC is used when the generating set is operated as a regenerative system. If the feedback signal voltage SVdc increases sufficiently to exceed the reference signal SRBC and so as to produce a higher output Sldgr2 from the Voltage Controller VCT for a given period of time, the Brake controller BVC will operate and produce a pulse width modulating drive to the transistor Th whereby to dissipate regenerative energy in the resistor Rh, which will restore the voltage across the capacitor Cb.

If the feedback voltage SVdc increases sufficiently to exceed the reference signal SRIF, the Amplitude and Frequency Correction circuit AFC will operate to produce an increase in the inverter output frequency to reduce the regenerative effect of motor type loads.

Figure 3:
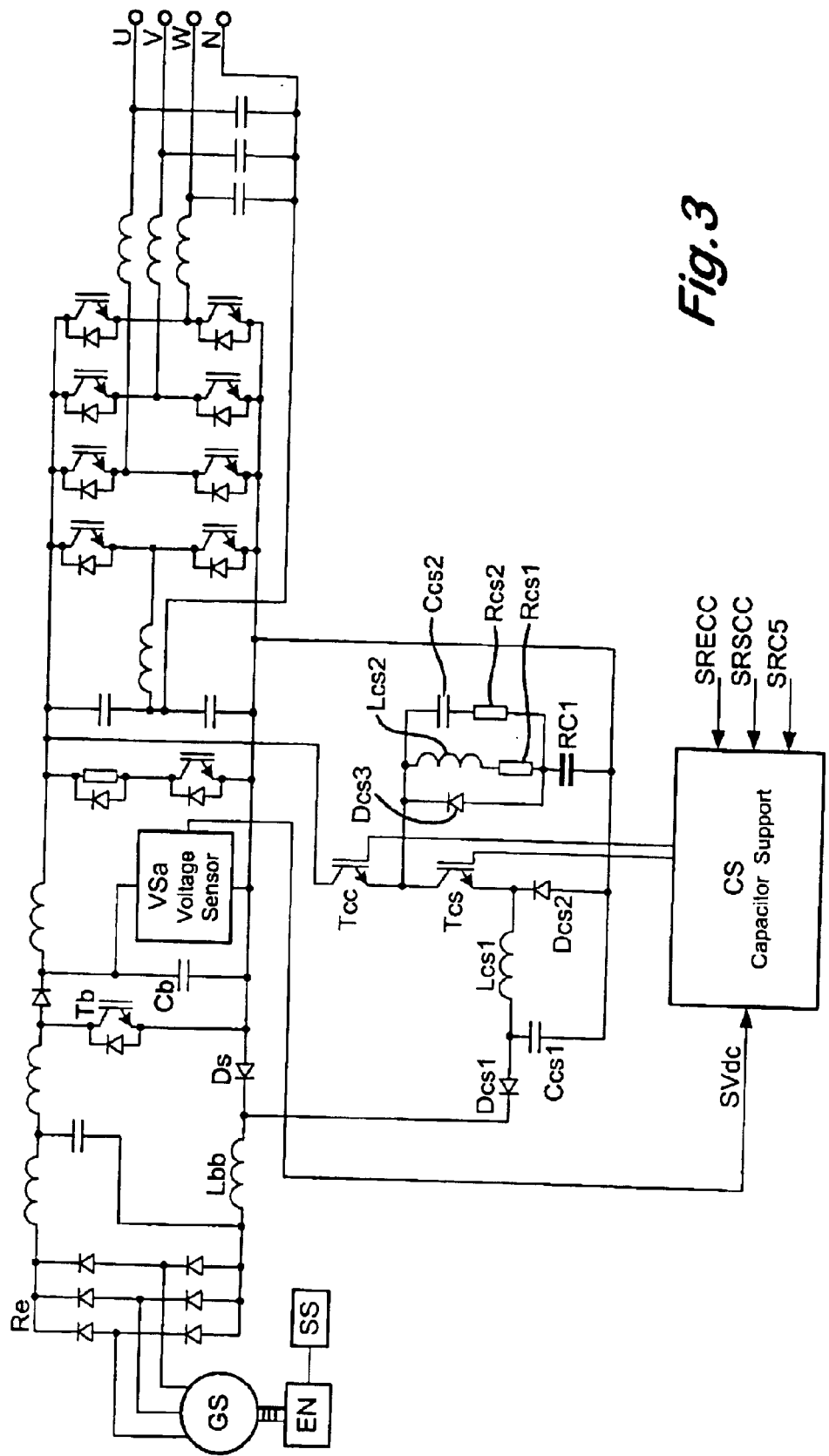
FIG. 3 is a circuit diagram of one modification of the generating set illustrated in FIGS. 1A and 1B, certain details of the circuit diagram shown-in FIGS. 1A and 1B being omitted for the sake of clarity.

FIG. 3 shows a modification which adds a Reservoir Capacitor RC1 with an associated charging and discharging system and smoothing components to the adjustable speed generating set shown in FIGS. 1A and 1B in order to provide that generating set with capacitor support. An extra power diode Ds is added in series with the DC link between the junction of the inductor Lbb and the emitter of the transistor Tb with the anode of the diode Ds facing the emitter of the transistor Tb. Under normal conditions the diode Ds is forward biased as the DC link current flows from the positive to the negative of the rectifier Re.

The charging and discharging system for the Reservoir Capacitor RC1 has an output terminal which is connected between the diode Ds and the inductor Lbb, and positive and negative input terminals which are connected in parallel with DC link at appropriate locations.

One side of the Reservoir Capacitor RC1 is connected to the negative input terminal of the charging and discharging circuit, to the anode of a diode Dcs2 and to one side of a capacitor Ccs1. The other side of the Reservoir Capacitor RC1 is connected in parallel with a series connected resistor Rcs2 and capacitor Ccs3, with another diode Dcs3 and with a series connected inductor Lcs2 and resistor Rcs1. The cathode of the diode Dcs2 is connected to the emitter of a transistor Tcs which has its collector connected to the emitter of another transistor Tcc which in turn has its collector connected to the positive input terminal of the charging and discharging circuit. The connection between the two transistors Tcc and Tcs is connected in parallel with the cathode of the diode Dcs3, the capacitor Ccs3 and the other end of the series connected inductor Lcs2 and resistor Rcs1. The other side of the capacitor Ccs1 is connected to the diode Dcs1 which has its cathode connected to the output terminal of the charging and discharging circuit. The other side of the capacitor Ccs1 is also connected to the emitter of the transistor Tcs through an inductor Lcs1.

A capacitor support control circuit CS has four inputs and two outputs. One of the inputs receives the DC Link voltage signal SVdc from the voltage sensor Vsa. Each of the other three inputs receives a respective reference signal SRECC, SRSCC or SRCS. Each of the outputs is connected to the base of a respective one of the transistors Tcc and Tcs to provide those transistors with pulse width modulated control so that they function as switches.

The Reservoir Capacitor RC1 is charged from the DC Link portion of the main control circuit under pulse width control provided by a buck converter formed by the transistor Tcc, the diode Dcs3, the inductor Lcs2 and the resistor Rcs1, the resistor Rcs2 and the capacitor Ccs3 suppressing diode switching noise. Discharge of the Reservoir Capacitor RC1 is under pulse width modulated control provided by a buck converter formed by the transistor Tcs, the diode Dcs2, the inductor Lcs1 and the capacitor Ccs1 and the electrical energy so discharged is injected in series into the DC Link portion of the main control circuit through the diode Dcs1, the power diode Ds being reverse biassed under those conditions.

Figure 4:
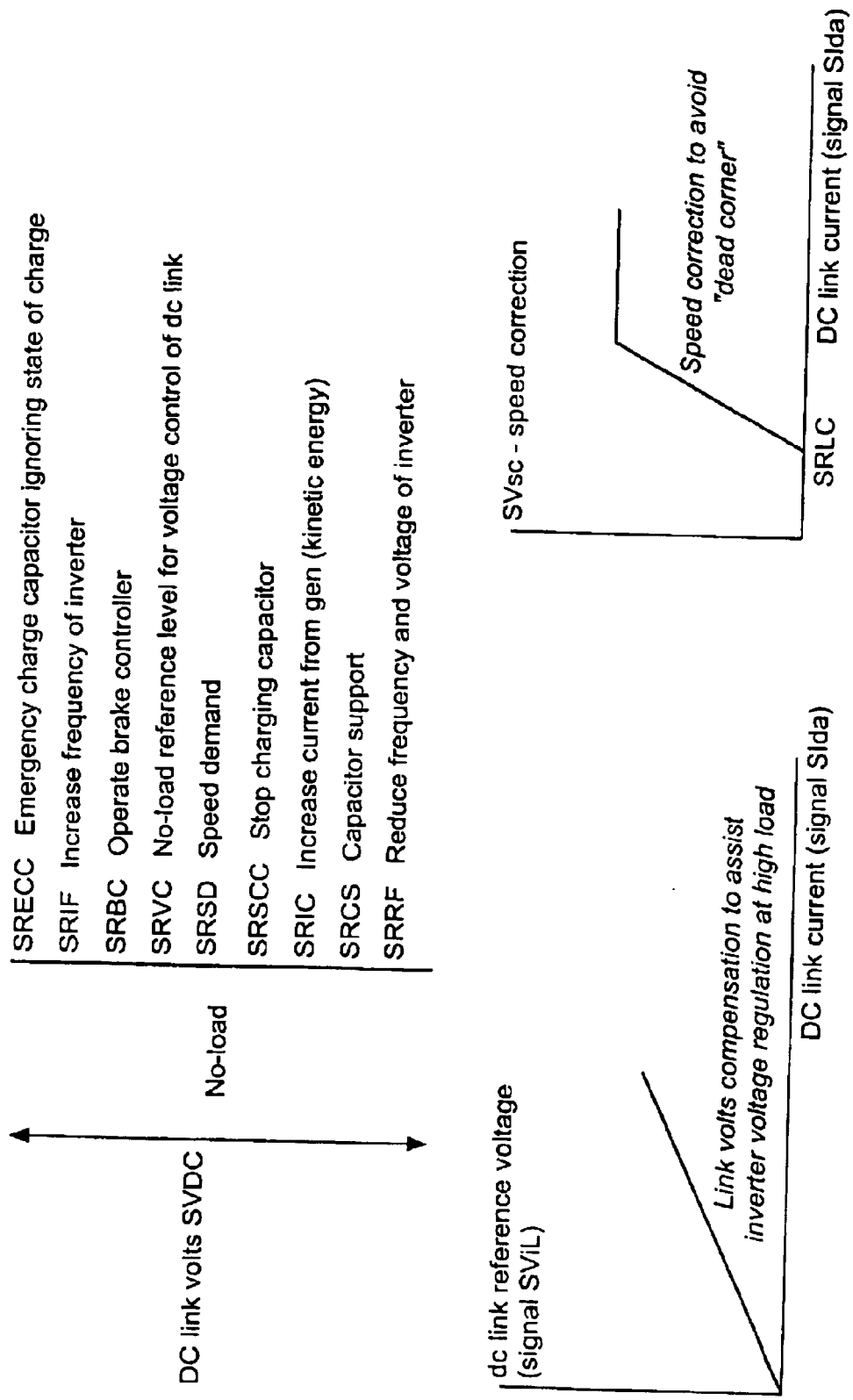
FIG. 4 illustrates the control strategy of the generating set modified as illustrated in FIG. 3.

The DC signal reference levels for the various controllers of the control circuit modified as shown in FIG. 3 differ from those described above for the main control circuit with reference to FIGS. 1A, 1B and 2 by the addition of a first reference SRECC (Emergency Charge Capacitor) which effects charging of the Reservoir Capacitor RC1, ignoring the state of that charge if the DC Link voltage SVdc >SRECC: and by the insertion of two other references, one, SRSCC immediately before the reference level SRIC (Increase current) and the other, SRCS immediately after that reference SRIC. This modified control strategy is illustrated in FIG. 4. The reference SRSCC (Stop Charging Capacitor) halts charging of the Reservoir Capacitor RC1 if the DC Link voltage SVdc<SRSCC. The reference SRCS (Capacitor Support) effects energy discharge from the Reservoir Capacitor RC1 if the DC Link voltage SVdc<SRCS.

Hence, if the applied step load causes the DC Link voltage SVdc to fall below the reference level SRSCC, the charging of the Reservoir Capacitor RC1 will stop. Depending on the state of charging of the Reservoir Capacitor RC1 at the time, this would release a surge of power and increase the DC Link voltage SVdc. On the other hand, if the DC Link feedback voltage SVdc falls below the reference level SRCS, electrical energy from the Reservoir Capacitor RC1 will be injected in series into the intermediate DC link portion of the main control circuit in a controlled manner. Since the main control circuit described above with reference to FIGS. 1A and 1B is a regenerative system which includes the brake controller BC, it the DC Link voltage SVdc should increase sufficiently to exceed the first reference level SRECC, emergency charging of the Reservoir Capacitor RC1 would begin in an attempt to absorb the regenerative energy in a limited manner.

Figure 5:
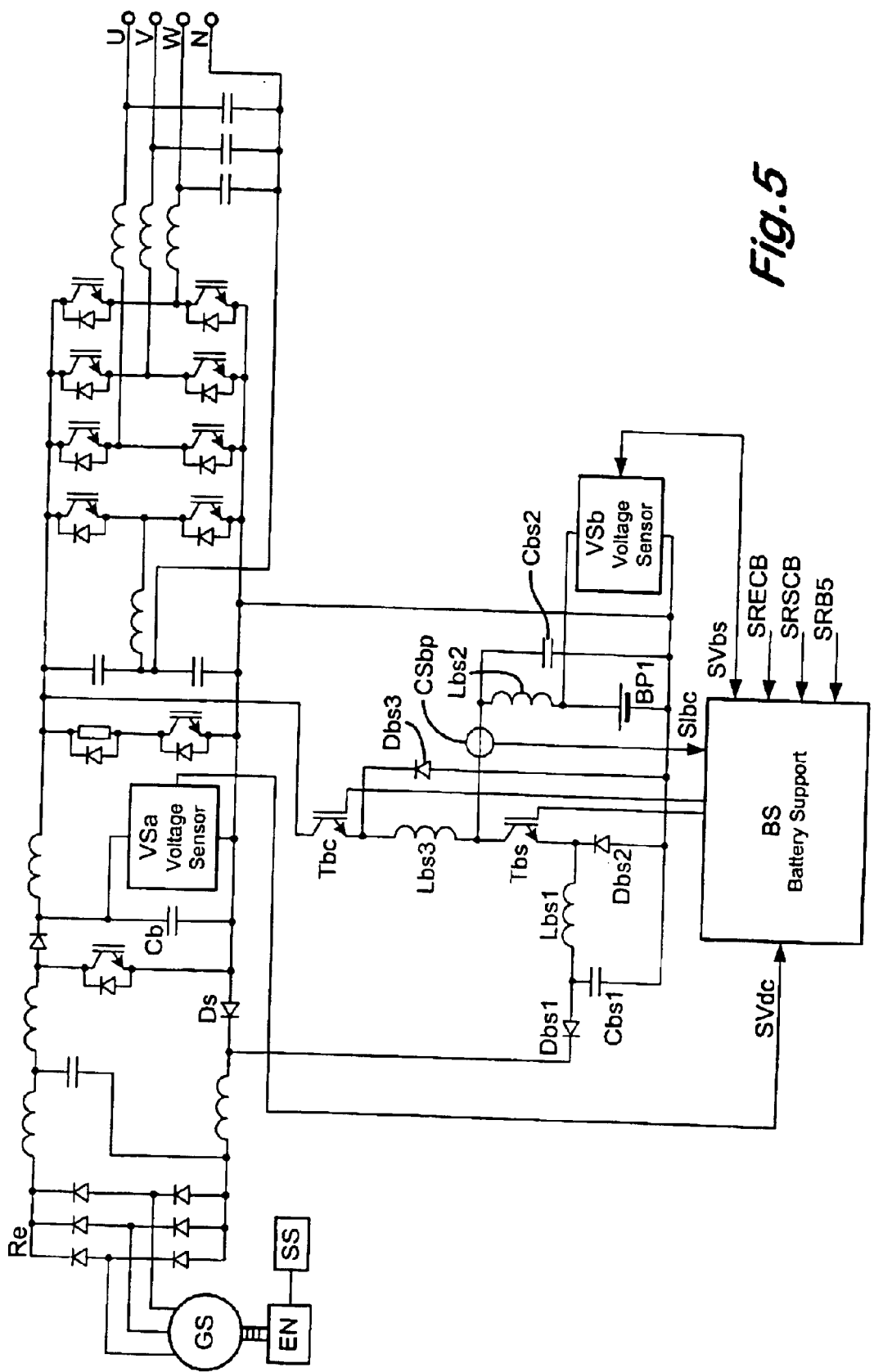
FIG. 5 is a circuit diagram similar to FIG. 3, of another modification of the generating set illustrated in FIGS. 1A and 1B.

FIG. 5 shows another modification which adds a battery pack BP1 and an associated charging and discharging system with smoothing components instead of the Reservoir Capacitor RC1 and its associated charging and discharging system with smoothing components. The elements of the charging and discharging system shown FIG. 5 which are similar to those of the similar system described above with reference to FIG. 3 are identified by the same references except that the character 'c' is replaced by the character 'b'.

The charging and discharging system shown in FIG. 5 differs from that shown in FIG. 3 in that there is no resistor equivalent to the resistor Rcs2 in series with the capacitor Cbs2. On the other hand there is an additional inductor Lbs3 which is connected in series between the emitter of the transistor Tbc and the collector of the transistor Tbs. The battery support control circuit BS has two more inputs than the capacitor support control circuit CS. One of those extra inputs receives a current signal from a current sensor CSbp which measures the current between the junction of the inductor Lbs3 and the collector of the transistor Tbs and the junction of the inductor Lbs2 and the capacitor Cbs2. The other extra input of the battery support control circuit BS receives a voltage signal from a voltage sensor VSb which is connected across the terminals of the battery pack BP1.

The buck convertor for charging the battery pack BP1 is formed by the transistor Tbc, the diode Dbs3, the inductor Lbs3 and the capacitor Cbs2. The inductor Lbs2 provides further battery ripple smoothing. Control of discharging of the battery pack BPI is similar to that described above for the Reservoir Capacitor RC1.

Figure 6:
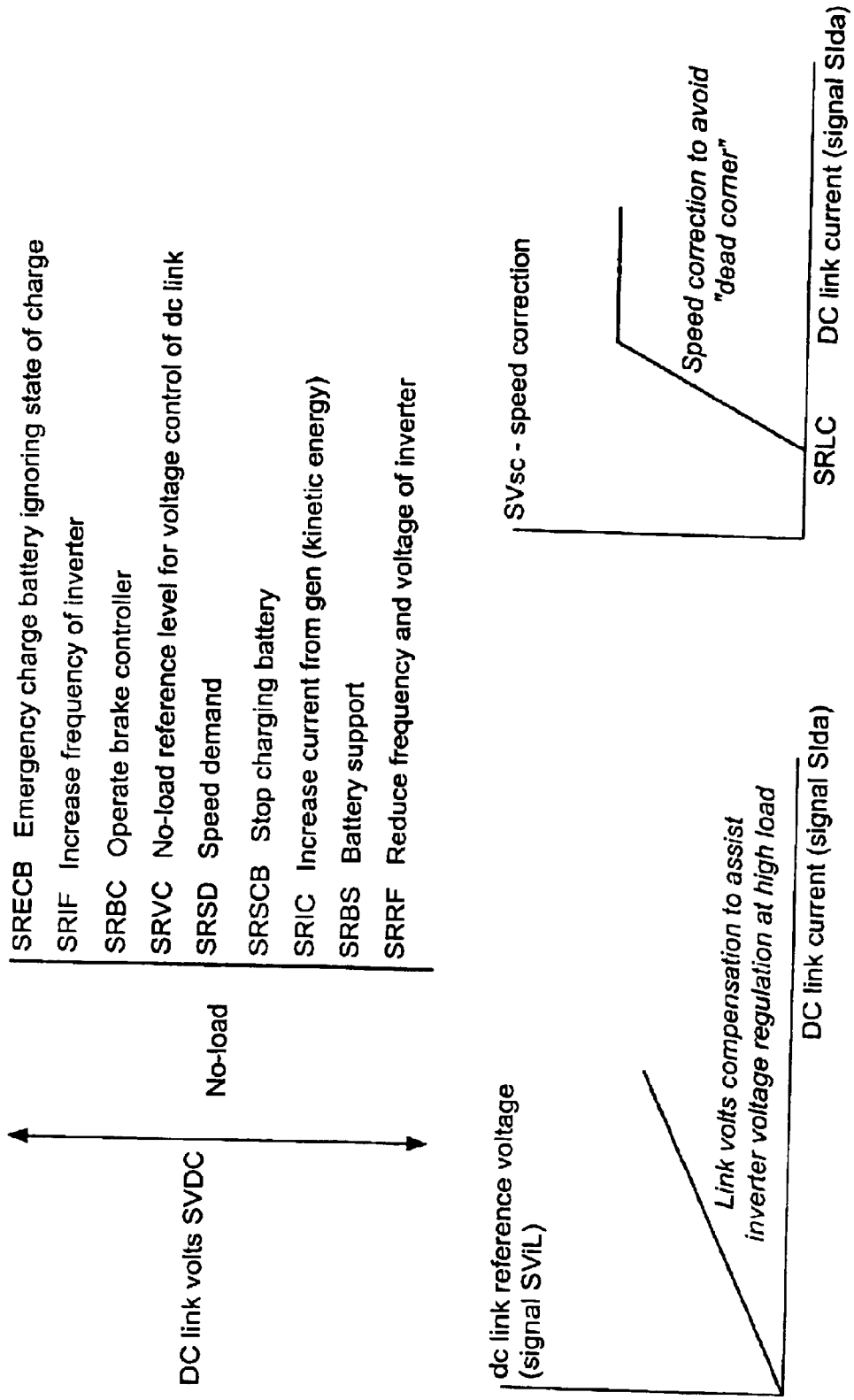
FIG. 6 is an illustration of the control strategy of the generating set illustrated in FIG. 5.

The DC signal reference levels for the various controllers of the control circuit modified as shown in FIG. 5 are similar to those that have described above with reference to FIGS. 3 and 4, the additional references being SRECB (emergency charge battery), SRSCB (stop charging battery) and SRBS (Battery support) rather than SRECC, SRSCC and SRCS as described for the Reservoir Capacitor RC1. The modified control strategy is illustrated in FIG. 6. Operation of the modified control circuit shown in FIG. 5 will be understood from the foregoing description of the modified control circuit shown in FIG. 3.

FIGS. 7A and 7B show the components of an electrical power generating set which differs from that shown in FIGS. 1A and 1B in a number of respects.

Firstly the engine speed control is simplified. There is no speed demand signal SVsd and the RV regulator of the circuit shown in FIG. 1A is omitted. The speed correction signal is retained. It is identified as Srs in FIG. 7A and there is an additional maximum speed reference signal Srmax. The output signal produced by the speed sensor SS is identified as Ssp in FIG. 7A. The speed controller SC controls operation of a fuel injection system of the engine EN in response to the four input signals Ssp, the speed correction signal Srs and the minimum and maximum speed reference signals Srmis and Srmax in order to control the engine EN and to maintain the speed of the engine EN between the minimum and maximum speeds and at a level which is related to the speed correction signal Srs which is derived from the intermediate load current.

The second difference is that the permanent magnet power generator G has two three-phase variable frequency and voltage outputs Ga and Gb.

Thirdly, each of the two three-phase variable frequency and voltage outputs Ga and Gb is rectified by a respective one of two full wave bridge rectifiers Re3a and Re3b. Each bridge rectifier Re3a, Re3b has a connection to a neutral terminal and has a power output terminal which, with respect to the neutral is positive in the case of the bridge rectifier Re3a and negative in the case of the bridge rectifier Re3b.

Another difference is that there are two booster circuits in the generating set shown in FIGS. 7A and 7B. A respective one of the two booster circuits is connected across the terminals of each bridge rectifier Re3a and Re3b and is operable to boost the power output voltage of the respective bridge rectifier Re3a, Re3b.

A further difference is that the neutral N of the AC power output of the generating set shown in FIGS. 7A and 7B is connected to the common neutral terminal of the two bridge rectifiers Re3a and Re3b and of the two booster circuits. This is in contrast to the arrangement of the electrical power generating set which is described above with reference to FIGS. 1A and 1B in which the neutral of the AC power output is generated and regulated by a controlled division of the intermediate DC voltage. The common neutral of the two bridge rectifiers Re3a and Re3b and of the two booster circuits is preferred in the arrangement of the electrical power generating set shown in FIGS. 7A and 7B because it is a reliably constant potential which serves as a good reference potential.

A further difference is that the DC link voltages generated by the two booster circuits of the generating set shown in FIGS. 7A and 7B, that comprise the potential drops Va and Vb across the two pairs of capacitors Ca1 and Ca2, and Cb1 and Cb2 that are connected in parallel, are monitored independently. Also the switching action of each of the transistors Ta and Tb of the two booster circuits is controlled independently by a respective separate control circuit. It is this independent control of the switching action of the transistors Ta and Tb that leads to the common neutral being a reliably constant potential.

Each of these control circuits includes a combined voltage sensor Vsab which monitors the two DC link voltages Va and Vb and which produces a respective voltage output signal SVa, SVb which is an indication of the respective DC link voltage Va, Vb at any one instant; a voltage controller Vca, Vcb which compares the respective voltage output signal SVa, SVb with a respective reference signal SVar, SVbr to produce a basic current demand signal, which also compares the speed sensor output signal Ssp with a respective reference signal St and which adds any amount by which the speed sensor output signal Ssp exceeds the respective reference signal St to the respective basic current demand signal to produce a current demand signal SImxa, SImxb; and a current controller Cca, Ccb which receives the current demand signal SImxa, SImxb at one input and the output SIa, SIb of a respective current sensor CSIa, CSIb as a feedback signal at another input and which has its output connected to the base of the respective transistor Ta, Tb. The current sensor CSIa monitors the rectified current that flows from the positive output terminal of the full-wave rectifier Re3a to the collector of the transistor Ta. The current sensor CSIb monitors the current that flows from the emitter of the transistor Tb to the negative output terminal of the full-wave rectifier Re3b. The output from each current controller Cca, Ccb provides a pulse width modulated drive to the base of the respective transistor Ta, Tb which controls the current and voltages to maintain the voltage Va, Vb across the respective capacitors Ca1 and Ca2, Cb1 and Cb2 constant as regulated by the respective voltage controller Vca, Vcb. Hence the intermediate DC voltage is maintained at the required potential by controlling that DC current output from the two rectifiers Re3a and Re3b.

There is no Maximum Load Torque Correction circuit in the generating set shown in FIGS. 7A and 7B. This follows from the only engine speed correction being derived from the sensed intermediate load current.

In contrast to the control circuitry for the inverter INV of the electrical power generating set shown in FIGS. 1A and 1B in which the inverter controller IC uses the capacitor currents measured by current sensors CSu, CSv and CSw of the respective LC filters for each phase of the three-phase output of the inverter INV to produce the phase lead characteristic for fast response and optimised damping, the inverter control circuitry of the electrical power generating set shown in FIGS. 7A and 7B has a current sensor CSIu, CSIv, CSIw connected between each of the junctions between the transistors Tau and Tbu, Tav and Tbv, Taw and Tbw of the inverter IN and the inductor Lu, Lv, Lw of the respective LC filter for each phase of the three-phase output of the inverter IN. The output signals from the current sensors CSIu, CSIv, CSIw are fed to respective inputs of the Inverter Controller IC.

FIGS. 7A and 7B show the diesel engine EN which is mechanically coupled with the rotor of the permanent magnet power generator G whereby to rotate the rotor relative to the stator of the generator G. The stator carries dual three phase windings Ga and Gb. Hence rotation of the rotor relative to the stator generates the two three-phase variable frequency and voltage AC outputs Ga and Gb from the generator G. The output Ga is positive and the output Gb is negative with respect to the neutral N.

The engine EN has an electronic speed sensor SS, the speed controller SC and the fuel injection system. The speed sensor SS produces the output signal Ssp which is indicative of the engine speed.

The positive three-phase output Ga is connected to the rectifier Re3a and the negative three-phase output voltage Gb is connected to the rectifier Re3b.

Each booster circuit includes an inductor La, Lb which has one side connected to the respective positive or negative output terminal of the respective bridge rectifier Re3a, Re3b. The other side of the inductor La, Lb is connected to one side of the respective current sensor CSIa, CSIb. The other side of the current sensor CSIa is connected to the collector of the transistor Ta and to the anode of a diode Da. The other side of the current sensor CSIb is connected to the emitter of the transistor Tb and to the cathode of a diode Db. The emitter of the transistor Ta and collector of the transistor Tb are connected to the neutral line N. The cathode of the diode Da is connected to one side of each of a pair of capacitors Ca1 and Ca2. The anode of the diode Db is connected to one side of capacitor Cb1 and, through a third current sensor CSI, to one side of capacitor Cb2. The other side of each of the capacitors Cal, Ca2, Cb1 and Cb2 is connected to the neutral line N. Hence current normally flows to the capacitors Ca1 and Ca2 and from the capacitors Cb1 and Cb2. The voltage across the capacitors Cal and Ca2 is boosted by the combined effect of the inductor La and the switching action of the parallel connected transistor Ta and the series diode Da. The voltage across the capacitors Cb1 and Cb2 is boosted by the combined effect of the inductor Lb and the switching action of the parallel connected transistor Tb and the diode Db. The output of the booster circuits is the voltage across the capacitors Ca1 and Cb1 and the sum of those voltages is maintained constant and forms the DC link voltage which is connected across the capacitors Ca2 and Cb2.

The voltage sensor Vsab is connected across the capacitor Ca1 and thereby is operable to monitor the voltage across that capacitor Ca1. Further the voltage sensor Vsab is also connected across the capacitor Chi and thereby is operable to monitor the voltage across that capacitor Cb1. Hence the voltage sensor Vsab is operable to monitor the DC link voltage. The voltage sensor VSab emits the two output signals SVa and SVb which are respectively an indication of the voltage across the capacitor Ca1 and the capacitor Cb1.

Each of the voltage controllers Vca and Vcb has four input ports and receives at one of those input ports the respective one of the output signals SVa and SVb emitted by the voltage sensor VSab. Each voltage controller Vca, Vcb receives the respective reference signal SVar, SVbr at another of its input ports. The output signal Ssp from the speed sensor SS is fed to a third of the input ports of each voltage controller Vca. Vcb and the reference signal St is fed to the fourth input port. The reference St is the maximum permitted current. It translates to a limiting speed for a given steady state power demand since current is varied by varying engine speed. The reference St is chosen as being the current that flows when the engine EN is operated at a certain working speed which is between the selected maximum and minimum engine speeds Srmax and Srmis and when a load is connected across the intermediate DC voltage. Each voltage controller Vca, Vcb has one output which emits the respective current demand signal SImxa, SImxb which is fed to an input of the respective current controller Cca, Ccb. Each current controller Cca, Ccb has another input at which the respective signal SIa, SIb from the respective current sensor CSIa, CSIb is received. Each current controller Cca, Ccb has one output which is connected to the base of the respective transistor Ta, Tb whereby to control the switching action of that transistor Ta, Tb.

A brake controller BC is connected across the DC link voltage between the parallel connected pairs of capacitors Ca1 and Cb1. Ca2 and Cb2. The arrangement and operation of the brake controller BC is substantially the same as that of the adjustable speed electrical power generating set described with reference to FIGS. 1A and 1B.

The three-phase DC/AC inverter IN is connected across the brake controller BC.

The third current sensor CSI measures current flow between the brake controller BC and the capacitors Cb1 and Cb2. The current sensor CSI emits a signal Sldb which is fed to one of the two inputs of the speed correction circuit SCC. The other input of the speed correction circuit SCC receives a reference signal SrLC and the output of the speed correction circuit SCC is the signal Srs that is fed to the speed controller, SC.

As with the electrical power generating set described above with reference to FIGS. 1A and 1B, the AC power output for each phase of the three-phase output of the inverter IN is produced by operation as bistable switching means of a respective one of three pairs of transistors Tau and Tbu: Tav and Tbv; Taw and Tbw which are connected in parallel with one another and with the pair of capacitors Cb1 and Cb2. Again, like the inverter INV of the adjustable speed generating set shown in FIGS. 1A and 1B, the series connection between the transistors of each pair Tau and Tbu, Tav and Tbv. Twa and Twb is connected to the respective power output terminal U, V, W through a respective inductor Lu, Lv and Lw. As explained above the current sensor CSIu, CSIv and CSIw is connected between the respective inductor Lu, Lv and Lw and the series connections between the respective pair of transistors Tau and Tbu, Tav and Tbv. Taw and Tbw. The three current sensors CSIu, CSIv and CSIw sense the current flow to the output terminals U, V, W and to the capacitors Cu, Cv and Cw of the respective LV filters. The output of each current sensor CSIu, CSIv and CSIw is connected to a respective input of the inverter controller IC.

The reference levels for the required values of output frequency and voltage are provided by an amplitude and frequency correction circuit AFC which has seven inputs and three outputs. It receives the output signals SVa and SVb from the voltage sensor VSab, that indicate the voltages across the capacitors Ca1 and Cb1 which together comprise the DC link voltage, at respective ones of the inputs. At the remaining five inputs it receives respective reference signals SRIF, SRRF, Sru1, Srv1 and Srw1. Three outputs Sru2, Srv2 and Srw2 from the voltage, amplitude and frequency correction circuit AFC are fed to respective one of three inputs of the inverter controller IC which also receives three input signals Svu, Svv and Svw from a voltage sensor Vsuvw which senses the output voltages at the respective power output terminals U, V, W and the neutral N of the generating set. The inverter controller IC controls the switching operation of the transistors Tau, Tbu, Tav, Tbv, Taw, Tvw of the three pairs of transistors of the inverter IN by emitting a respective pulse-width modulation signal from a respective output Tau, Tbu; Tav, Tbv; Taw, Tbw which is connected to the base of the respective transistor Tau, Tbu, Tav, Tbv, Taw, Tbw.

Operation of the electrical power generating set shown in FIGS. 7A and 7B will be apparent from the foregoing description of operation of the adjustable speed electrical power generating set shown in FIGS. 1A and 1B in conjunction with the foregoing description of FIGS. 7A and 7B.

FIG. 8 is a graph of Power against speed. Power is the product of Torque and speed. The upper curve is engine power. The lower curve is power produced by the generator G under normal conditions when its operation is controlled by the control system described above with reference to FIGS. 7A and 7B.

Controlling the current controls the torque. Hence limiting current limits torque.

The closer the engine EN is run to operating at maximum torque, the lower is the available acceleration. The engine EN cannot be accelerated when it is running at maximum speed.

The torque, and thus the power produced by the generator G is allowed to be increased up to the level of the maximum power that is delivered by the engine EN as the engine EN approaches its maximum speed.

If SSp>St then the reference current signal SImxa and SImxb are increased proportionately to the difference between St and SSp.

The torque produced by the generator G is allowed to be increased up to the maximum torque produced by the engine EN until a balance is achieved.

FIGS. 9A and 9B show the components of a generating set which is similar to that shown in FIGS. 7A and 7B in many respects. Like parts are identified in FIGS. 7A and 7B and 9A and 9B by the same reference characters and the foregoing description with reference to FIGS. 7A and 7B applies equally to FIGS. 9A and 9B in their respect. The differences between these two generating sets are in the inverter IN and are now described with reference to FIGS. 9A and 9B.

The junction between the pair of transistors Tau and Tbu, Tav and Tbv, Taw and Tbw for each phase of the three phase inverter IN is also connected to one side of a respective rectifier Reu, Rev, Rew. The other side of the rectifier Reu, Rev, Rew is connected to the neutral line N. A third bistable switch for each phase, which is in the form of a transistor Tu, Tv, Tw is connected in parallel with the respective rectifier Reu. Rev, Rew with its emitter connected to the neutral input of the rectifier Reu, Rev, Rew through one of the diodes of that rectifier Reu, Rev, Rew. Each transistor Tu, Tv, Tw with its parallel connected rectifier Reu, Rev, Rew operates as a bi-directional switch whereby zero voltage is supplied to the output filter Lu, Cu; Lv, Cv; Lw, Cw of the respective phase when the transistor Tu, Tv, Tw is switched to its conducting state. Operation of each transistor Tu, Tv, Tw is controlled by an appropriate pulse width modulation signal from the inverter controller IC which is fed to the base of the respective transistor Tu, Tv, Tw through a respective output Tu, Tv, Tw of the inverter controller IC.

The current sensor CSIu, CSIv and CSIw that is connected between the respective inductor Lu, Lv, Lw and the series connections between the respective pair of transistors Tau and Tbu, Tav and Tbv, Taw and Tbw is also connected between the respective inductor Lu, Lv, Lw and a respective pair of the diodes of the respective rectifier Reu, Rev, Rew.

The controllers Vca, Vcb, Cca, Ccb, SCC, SC, AFC and IC are programmed microprocessors. The current sensors CSIa, CSIb, CSI, CSIu, CSIv and CSIw sense current flow in a wire into which they are connected. They may be galvanic, such as a shunt, non-galvanic in that they sense an electromagnetic field around the wire and emit an output signal based thereon, or they may be a current transformer.

Operation of the electrical power generating set shown in FIGS. 9A and 9B will be apparent from the foregoing description of operation of the electrical power generating set shown in FIGS. 1A and 1B in conjunction with the description of FIGS. 7A and 7B.

In operation, each of the transistors Tau, Tav. Taw of each phase of the inverter IN is switched to its operating state by a pulse width modulation signal applied to its base by the inverter controller IC. The other transistors Tbu, Tbv, Tbw and Tu, Tv, Tw are in their non-conducting state. Hence the transistor Tau, Tav. Taw connects the capacitor Ca2 to the respective output terminal U, V, W through the inductor Lu, Lv, Lw of the respective LC output filter for that phase. The capacitor Ca2 is charged to the positive DC potential Va. After a short period of time in which the positive DC potential Va is fed to the output terminals, the transistor Tau, Tav, Taw is switched to its other, non-conducting state and the transistors Tu, Tv, Tw are switched to their conducting state in which they connect the side of the conductor Lu, Lv, Lw remote from the respective capacitor Cu, Cv, Cw to neutral so that the voltage produced by the respective rectifier Reu, Rev, Rew with the respective transistor Tu, Tv, Tw is zero volts. The other transistors Tbu, Tbv, Tbw remain in their non-conducting state for this period but they are subsequently switched to their conducting state when the transistors Tu, Tv, Tw are switched to their non-conducting states and the transistors Tau, Tav and Taw remain in their non-conducting states. Switching the transistors Tbu, Tbv, Tbw to their conducting state connects the negative DC potential stored in the capacitor Cb2 to the respective output terminal U, V, W through the respective inductor Lu, Lv, Lw for a further period. At the end of that period, the transistors Tbu, Tbv, Tbw are switched to their non-conducting state and the transistors Tu, Tv and Tw are again switched to their conducting states so that the voltage fed to the output terminals through the inductors Lu, Lv, Lw is zero for a further period whilst the other transistors Tau, Tav, Taw remain in their non-conducting states. The sequence is then repeated. It will be understood that the three phases are operated simultaneously but with a 120 degrees phase angle between them.

When the transistors Tu, Tv, Tw are switched to their conducting states to connect the output terminals to neutral, the sum of energy stored in the output filters Cu, Lu; Cv, Lv; Cw, Lw is constant, neglecting losses.

When a load is connected to the output terminals U. V, W and N there is no "reactive power flow" through the system to the DC potential capacitors Ca2 and Cb2.

The generating set described above with reference to FIGS. 9A and 9B has the following advantages. The ripple current is low. The intermediate DC voltage may be lower for the same output Vrms voltage. The capacitance of the DC link storage voltage may be lower. Switching losses may be lower and distributed. The transistors Tau, Tav, Taw, Tbu, Tbv, Tbw of the inverter IN are switched to their conducting state for shorter periods of time. The AC output filter capacity may be lower since the capacitor Cu, Cv, Cw would be charged by the lower ripple current. The modulation system voltage variability would be lower and would result in a stable operation so that lower rated capacitors and inductors may be used. That reduction in the rating of the output filter inductor Lu, Lv, Lw would yield a lower voltage drop when a non-linear load is applied. The rated voltage of the transistors Tu, Tv, Tw needs to be only half that of the main transistors Tau. Tav, Taw, Tbu, Tbv, Tbw.

Although the aspect of the invention that is illustrated in FIGS. 9A and 9B has been described as being carried out in a three phase system, it could be carried out in a single phase system or in a multiphase system having any suitable number of phases.

What is claimed is:

1. An AC power generating system including inverter means which are operable to convert an intermediate DC voltage into an AC power output, means for generating and maintaining the intermediate DC voltage at one level and voltage sensor means operable to monitor the intermediate DC voltage, wherein control means are provided for the inverter means, said control means being responsive to the voltage sensor means and being operable to control operation of the inverter means so that at least one of the voltage and the frequency of the AC power output is reduced in response to a fall in the intermediate DC voltage to a certain level caused by the application of a step load to the AC power output whereby to provide a transient off-loading effect which will give the generating means time to respond and thereby allow the intermediate DC voltage to be restored to said one level.

2. An AC power generating system according to claim 1 wherein a neutral setting of the AC power output is generated and regulated by a controlled division of the intermediate DC voltage.

3. An AC power generating system according to claim 1 wherein the means for generating and maintaining the intermediate DC voltage include generator means operable to generate a variable voltage AC power supply and rectifier means having an output and operable to rectify the variable voltage AC power supply to establish the intermediate DC voltage.

4. An AC power generating system according to claim 3 wherein a neutral setting of the AC power output is generated and regulated by a controlled division of the intermediate DC voltage and said rectifier means are full wave rectifier means.

5. An AC power generating system according to claim 1, wherein said means for generating the intermediate DC voltage include booster means which are operable to establish the intermediate DC voltage.

6. An AC power generating system according to claim 5, wherein said means for generating and maintaining the intermediate DC voltage include generator means operable to generate a variable voltage power supply and respective control means, and the voltage sensor means provide a feedback control signal to the control means of the generator means whereby to effect variation of the variable voltage power supply and thereby to counter a tendency of the intermediate DC voltage to vary.

7. An AC power generating system according to claim 6, wherein the generator means are driven by a variable speed prime mover, the control means of the generator means comprising speed control means operable to control the speed of the prime mover.

8. An AC power generating system according to claim 7, including current sensor means operable to monitor a DC load current caused by connection of a load across the intermediate DC voltage, the current sensor means being operable to emit a signal which is indicative of the monitored DC load current, comparator means being provided for comparing an output signal from the current sensor means with a reference signal and for emitting a speed correction signal which is proportional to the amount by which the signal from the current sensor means exceeds the reference, the output from the comparator means being supplied to the speed control means of the generator means to effect an increase in the speed of the prime mover above that required for the applied load.

9. An AC power generating system according to claim 6 including brake control means and means responsive to the output of the voltage sensor means that is operable to monitor the intermediate DC voltage whereby to connect the brake control means across the intermediate DC voltage to apply a load thereto when the intermediate DC voltage rises to a certain level.

10. An AC power generating system according to claim 1 wherein said control means for the inverter means are operable to increase the frequency of the AC power output in response to an increase in the intermediate DC voltage to a certain high level.

11. An AC power generating system according to claim 10 wherein said control means for the inverter means are operable to increase the frequency of the AC power output in response to an increase in the intermediate DC voltage to a certain high level which is higher than the level at which the brake control means is connected across the intermediate DC voltage.

12. An AC power generating system according to claim 3, including booster means having an input which is connected to the output of the rectifier means and which are operable to increase the voltage of the rectified output of said rectifier means and thereby establish the intermediate DC voltage, and including electrical energy storage means connected across the intermediate DC voltage so as to be charged by the intermediate DC voltage, wherein bistable switching means and associated control means are provided, said bistable switching means normally being in one state in which they are operable to make the connection of the electrical energy storage means across the intermediate DC voltage to enable the electrical energy storage means to be charged and to interrupt a connection between the electrical energy storage means and the connection between the output of the rectifier means and the input of the booster means, said bistable switching means being operable in its other state to isolate the electrical energy storage means from the intermediate DC voltage and to make said connection of the electrical energy storage means with the connection between the output of the rectifier means and the input of the booster means whereby to enable discharge of electrical energy from said electrical energy storage means into the connection between the rectifier means and the booster means, said control means associated with the bistable switching means being responsive to the monitored intermediate DC voltage and being operable in response to a fall in said intermediate DC voltage to a certain reference level to switch said bistable switching means from its normal said one state to said other state whereby to discharge electrical energy to augment the rectified output of the said rectifier means and thereby to counter the sensed fall in said intermediate DC voltage.

13. An electrical power generating system including generator means operable to generate a variable voltage power supply, booster means having an input which is connected to an output of said generator means and which are operable to increase the voltage of the output of said generator means and thereby to provide a DC voltage, a variable speed prime mover drivingly coupled with the generator means, and speed control means operable to control the speed of the motor, wherein current sensor means are provided, said current sensor means being operable to monitor a current caused by connection of a load across the DC voltage, the current sensor means being operable to emit a signal which is indicative of the monitored current, comparator means being provided for comparing an output signal from the current sensor means with a reference signal and for emitting a speed correction signal which is proportional to the amount by which the output signal from the current sensor means exceeds the reference signal, the output from the comparator means being supplied to the speed control means for the generator means to effect an increase in the speed of the variable speed prime mover, wherein the improvement comprises said current sensor means being operable to monitor the DC load current on the side of said booster means remote from said rectifier means.

14. An electrical power generating system according to claim 13, wherein said generator means are operable to generate a variable voltage AC power supply and rectifier means are provided, the rectifier means having an output and being operable to rectify the variable voltage AC power supply, the booster means being connected to the output of the rectifier means and being operable to increase the voltage of the rectified output of said rectifier means.

15. An electrical power generating system including generator means operable to generate a variable voltage AC power supply, booster means having an input which is connected to the output of the generator means and which is operable to increase the voltage of the output of said generator means and thereby to provide a DC voltage, voltage sensor and control means operable to monitor the DC voltage and to provide a feedback control signal to the generator means whereby to vary the variable voltage power supply so as to counter a tendency of the DC voltage to vary, and electrical energy storage means connected across the DC voltage so as to be charged by the DC voltage, wherein bistable switching means and associated control means are provided, said bistable switching means normally being in one state in which they are operable to make the connection of the electrical energy storage means across the DC voltage to enable the electrical energy storage means to be charged and to interrupt a connection between the electrical energy storage means and a connection between the generator means and the input of the booster means, said bistable switching means being operable in its other state to isolate the electrical energy storage means from the DC voltage and to make said connection of the electrical energy storage means with the connection between the generator means and the input of the booster means, whereby to enable discharge of electrical energy from said electrical energy storage means into the connection between the generator means and the booster means, said control means associated with the bistable switching means being responsive to the monitored DC voltage and being operable in response to a fall in said DC voltage to a certain reference level to switch said bistable means from its normal said one state to said other state whereby to discharge electrical energy to augment the variable voltage power supply and thereby to counter the sensed fall in said DC voltage.

16. An electrical power generating system according to claim 15, in which said generator means is operable to generate a variable voltage AC power supply and rectifier means are provided, said rectifier means having an output and being operable to rectify the variable voltage AC power supply, wherein said connection between the generator means and the input of the booster means is the connection between the rectifier means and the input of the booster means so that the discharged electrical energy augments the rectified output of said rectifier means.

17. An electrical power generating system according to claim 15, which is an AC power generating system in which said DC voltage is an intermediate DC voltage and inverter means are provided, said inverter means being operable to convert the intermediate DC voltage into an AC power output for supplying to an external load.

18. An electrical power generating system including variable voltage power supply generator means, converter means operable to establish a DC link by converting the variable voltage power supply to a DC voltage, voltage sensor means operable to monitor the DC voltage and control means responsive to an output from the voltage sensor means and operable to maintain the DC voltage at one level, wherein the generator means is operable to generate two variable voltage power supplies each connected on one side to a common terminal and having an output voltage terminal on its other side, the output voltage terminal of one of the power supplies being positive and the output voltage terminal of the other power supply being negative such that the two variable voltage power supplies together comprise the DC voltage, the voltage sensor means comprising two voltage sensors severally responsive to a respective one of the power supplies and the control means comprising two controllers severally operable to maintain the voltage of each of those power supplies at a certain level whereby to maintain the DC voltage at said one level.

19. An electrical power generating system according to claim 18, wherein there are two booster circuits, each connected between a respective one of the output voltage terminals of the two power supplies and the common terminal and each operable to increase the voltage of the respective output potential and thus to increase said DC voltage, each of the controllers being operatively associated with the respective one of the booster circuits.

20. An AC power generating system including variable voltage AC power supply generator means, rectifier means having an output and operable to rectify the variable voltage AC power supply to establish an intermediate DC voltage, inverter means which are operable to convert the intermediate DC voltage into an AC power output, voltage sensor means operable to monitor the intermediate DC voltage and control means responsive to an output from the voltage sensor means and operable to maintain the intermediate DC voltage at one level, wherein the generator means is operable to generate two variable voltage AC power supplies, the rectifier means comprise two full-wave rectifiers, each full-wave rectifier being operable to rectify a respective one of the two variable voltage AC power supplies and each being connected on one side to a neutral terminal and having an output voltage terminal on its other side, the output voltage terminal of one of the full-wave rectifiers being positive and the output voltage terminal of the other full-wave rectifier being negative such that the two variable voltage AC power supplies are severally rectified to produce a positive and a negative potential respectively which together comprise the intermediate DC voltage, the voltage sensor means comprising two voltage sensors severally responsive to a respective one of the positive and negative output potentials of the two full-wave rectifiers and the control means comprising two controllers severally operable to maintain each of those positive and negative potentials at a certain level whereby to maintain the intermediate DC voltage at said one level.

21. An AC power generating system according to claim 20, wherein there are two booster circuits, each connected between a respective one of the output voltage terminals of the two full-wave rectifiers and the neutral terminal and each operable to increase the voltage of the respective output potential and thus to increase the intermediate DC voltage, each of the controllers being operatively associated with the respective one of the booster circuits.

22. An electrical power generating system according to claim 20 wherein the generator means is a permanent magnet generator driven by a variable speed prime mover provided with speed control means operable to control the speed of the prime mover.

23. An AC power generating system according to claim 20, wherein the generator means is driven by a variable speed prime mover provided with speed control means operable to control the speed of the prime mover and current sensor means operable to monitor a DC load current caused by connection of a load across the intermediate DC voltage are provided, the current sensor means being operable to emit a signal which is indicative of the monitored DC load current, comparator means being provided for comparing an output signal from the current sensor means with a reference signal and for emitting a speed correction signal which is proportional to the amount by which the signal from the current sensor means exceeds the reference, that speed correction signal being supplied to the speed control means for the generator as a feed back control signal whereby to effect variation of the variable AC power supply and thereby to counter any tendency of the intermediate voltage to vary.

24. An AC power generating system according to claim 20 including brake control means and means responsive to the output of the two voltage sensors that are operable to monitor the positive and negative output potentials whereby to connect the brake control means across the intermediate DC voltage to apply a load thereto when the potential difference between the monitored positive and negative potentials rises to a certain level.

25. An AC power supply generating system according to claim 24 wherein one pair of capacitors are connected in parallel between the positive output potential and the neutral terminal, another pair of capacitors are connected in parallel between the negative output potential and the neutral terminal and the brake control means are connected across the positive and negative output potentials between the capacitors of each pair.

26. An AC power supply generating system according to claim 23, wherein one pair of capacitors are connected in parallel between the positive output potential and the neutral terminal, another pair of capacitors are connected in parallel between the negative output potential and the neutral terminal and the brake control means are connected across the positive and negative output potentials between the capacitors of each pair, and wherein the current sensor means that are operable to monitor
the DC load current caused by connection of a load across the intermediate DC voltage are connected in one of the positive and the negative connections between the brake control means and the capacitors of each pair that are remote from the two full-wave rectifiers and that are nearer to the inverter means.

27. A method of converting a DC voltage having a positive and negative level of electrical potential into an AC power output in which the positive and negative levels of electrical potential are connected to an AC power output terminal
alternately, wherein each connection of one of the positive and negative levels of electrical potential to the output terminal is separated in time from a connection of the other of the positive and negative levels of the electrical potential to the output terminal by an intermediate period of zero voltage.

28. A method according to claim 27, wherein the source of each of the positive and negative potentials of DC voltage is a respective charged capacitor and the positive and negative levels of electrical potential are connected alternately to the AC power output terminal through an output filter, both sides of the output filter being connected to neutral for said intervening periods.

29. A DC to AC converter including a first source of electrical energy operable to be charged with a positive DC potential, a second source of electrical energy operable to be charged with a negative DC potential, first bistable switching means operable in one state to connect the first electrical energy source to an AC power output terminal through an inductor means of an output filter means and to break that connection in its other state, and second bistable switching means operable in one state to connect the second electrical energy source to the AC power output terminal through said inductor means and to break that connection in its other state, wherein the improvement comprises third bistable switching means which are operable in one state to connect said inductor means to neutral and to break that connection in its other state, and control means operable to control operation of said first, said second and said third bistable switching means so that said first and said second bistable switching means are switched to their said one state alternately and are in their said other state when the other of said first and second bistable switching means are in their said one state and said third bistable switching means is switched to its said one state whilst said first and second bistable switching means are both switched to their said other state between each alternate switching of said first and second bistable switching means to their said one state so that the positive and negative, levels of electrical potential with which said first and second electrical energy sources are charged when said converter is operated are connected to the AC power output terminal alternately and each connection of the one of the positive and negative levels of electrical potential to the output terminal is separated in time from a connection of the other of the positive and negative levels of electrical potential to the output terminal by an intervening period of zero voltage.

30. A DC to AC converter according to claim 29, wherein the output filter means includes a third chargeable source of electrical energy which is connected on one side to the inductor means and on its other side to neutral, the third bistable switching means being operable to connect the other side of the inductor means to neutral when in its said one state.

31. A DC to AC converter according to claim 29, which is the inverter means of an AC power generating system which includes variable voltage power supply generating means operable to establish an intermediate DC voltage, the inverter means being operable to convert the intermediate DC voltage into the AC power output, there being voltage sensor means operable to monitor the intermediate DC voltage and control means responsive to an output of the voltage sensor means and operable to maintain the intermediate DC voltage at one level.

32. An AC power generating system according to claim 31, wherein the generating means is operable to generate two variable voltage AC power supplies, and two full wave rectifiers are provided, each being operable to rectify a respective one of the two variable voltage AC power supplies and each being connected on one side to a neutral terminal and having an output terminal on its other side, the output terminal of one of the fullwave rectifiers being positive and the output terminal of the other fullwave rectifier being negative such that the two variable voltage AC power supplies are rectified to produce a positive and a negative potential respectively which together comprise the intermediate DC voltage and which are respectively connected across the first and second electrical energy storage means, there being voltage sensor means severally responsive to a respective one of the positive and negative output potentials of the two fullwave rectifiers and control means operable to maintain each of those positive and negative potentials at a certain level whereby to maintain the intermediate DC voltage at one level.

33. A DC to AC converter according to claim 31, wherein there are two booster circuits, each connected between a respective one of the output terminals of the two fullwave rectifiers and the neutral terminal and each operable to boost the respective one of the output electrical potentials, each of the control means being operatively associated with a respective one of the booster circuits.

34. A method of operating an electrical power generating system of the kind which includes an engine driven generator which provides a variable voltage electrical output, booster means operable to boost the voltage of the variable voltage electrical output and thereby to provide an intermediate DC voltage, inverter means which are operable to convert the intermediate DC voltage into an AC power output, means operable to maintain the intermediate DC voltage at one level up to a predetermined speed of the engine driven generator which is less than the maximum speed thereof being provided, wherein the means operable to maintain the intermediate DC voltage at said one level is disenabled when the speed of the engine driven generator rises to at least said predetermined speed and the speed of the engine driven generator and the intermediate DC voltage are allowed to rise so that, when the engine driven generator is running at maximum speed, the electrical power output is allowed to increase until a balance is achieved.

35. A method of operating an AC power generating system including the steps of:

(i) operating a variable speed prime mover driven generator to generate a variable voltage AC power supply;

(ii) rectifying the variable voltage AC power supply to establish an intermediate DC voltage;

(iii) controlling the intermediate DC voltage to maintain it at a substantially constant level;

(iv) operating an inverter to convert the intermediate DC voltage into an AC power output;

(v) monitoring the intermediate DC voltage; and (vi) controlling operation of the prime mover driven generator by feedback control so as to increase its speed when the monitored intermediate DC voltage falls to the level of the first reference voltage whereby to restore the intermediate DC voltage to said substantially constant level; characterized by the further steps of (vii) comparing the intermediate DC voltage with a first reference voltage which is lower than the substantially constant level: and wherein (viii) the intermediate DC voltage is also compared with a second reference voltage which is lower than said first reference voltage, and (ix) operation of the inverter is controlled so as to reduce the voltage and/or frequency of the AC power output when the monitored intermediate DC voltage falls to the level of the second reference voltage whereby to provide a transient off-loading effect which assists restoration of the intermediate DC voltage to said substantially constant level.

36. A method of operating an AC power generating system according to claim 35, including the further steps of:

a) monitoring a DC load current which results from connection of a load across the intermediate DC voltage b) comparing the monitored DC load current with a certain current reference level; and c) further controlling operation of the prime mover driven generator by feedback control when the monitored DC load current exceeds the certain current reference level whereby to further increase the speed of the prime mover driven generator by an amount which is proportional to the amount by which the monitored DC load current exceeds the certain current level.

37. A method of operating an AC power generating system according to claim 35, including the further step of controlling operation of the inverter so as to increase the frequency of the AC power supply when the monitored DC voltage rises to the level of a third reference voltage.

38. A method of operating an AC power generating system according to claim 35 including the further step of connecting a brake controller across the intermediate DC voltage to apply a load thereto when the monitored DC voltage rises to a certain voltage level.

39. A method of operating an AC power generating system according to claim 38 including the further step of controlling operation of the inverter so as to increase the frequency of the AC power supply when the monitored DC voltage rises to the level of a third reference voltage wherein the third reference voltage is higher than said certain voltage level.

40. A electrical power generating system including generator means operable to generate a variable voltage generator output, a variable speed prime mover drivingly coupled with the generator means, speed control means operable to control the speed of the prime mover, converter means operable to establish a DC link by converting the variable voltage generator output into a DC voltage and to derive an electrical power output from that DC voltage for supply to an external load, sensing means operable to monitor the DC link when the load is connected across the DC voltage and to provide a feedback to the speed control means whereby to effect variation of the variable voltage electrical output thereby to counter a tendency of the DC voltage to vary so as to maintain the DC voltage at one level, wherein control means are provided for said converter means, said control means being responsive to the sensing means and being operable to control operation of said converter means so that the voltage of the electrical power output is reduced in response to a fall in the DC voltage to a certain level caused by the application of a step load to the electrical power output whereby to provide a transient off-loading effect which will give the generator means time to respond and thereby allow the DC voltage to be restored to said one level.

41. An electrical power generating system according to claim 40, including inverter means which are operable to convert the DC voltage into an AC power output, said sensing means including voltage sensor means operable to monitor the DC voltage, wherein the transient off-loading effect is provided by said control means being responsive to the voltage sensor means and being operable to control operation of the inverter means so that at least one of the voltage and the frequency of the AC power output is reduced in response to a said fall in the DC voltage.

42. An electrical power generating system according to claim 40 wherein said sensing means includes current sensor means operable to monitor a DC load current caused by connection of a load across the DC voltage, the current sensor means being operable to emit a signal which is indicative of the monitored DC load current, comparator means being provided, for comparing an output signal from the current sensor means with a reference signal and for emitting a speed correction signal which is proportional to the amount by which the signal from the current sensor means exceeds the reference, the output from the comparator means being supplied, to the speed control means of the generator means to effect an increase in the speed of the prime mover above that required for the applied load.

43. An electrical power generating system according to claim 41, including brake control means and means responsive to the output of the voltage sensor means that is operable to monitor the DC voltage whereby to connect the brake control means across the DC voltage to apply a load thereto when the DC voltage rises to a certain level.

44. An electrical power generating system according to claim 41, wherein said control means for the inverter means are operable to increase the frequency of the AC power output in response to an increase in the DC voltage to a certain high level.

45. An electrical power generating system according to claim 41 wherein said certain level is higher than the level at which the brake control means is connected across the DC voltage.

46. An electrical power generator system according to claim 41 in which the variable voltage generator output is an AC power supply and including rectifier means having an output operable to rectify the variable voltage AC power supply, booster means having an input which is connected to the output of the rectifier means and which are operable to increase the voltage of the rectified output of said rectifier means and thereby to establish the DC voltage and electrical energy storage means connected across the DC voltage so as to be charged by the DC voltage, wherein bistable switching means and associated control, means are provided, said bistable switching means normally being in one state in which they are operable to make the connection of the electrical energy storage means across the DC voltage to enable the electrical energy storage means to be charged and to interrupt a connection between the electrical energy storage means and the connection between the output of the rectifier means and the input of the booster means, said bistable switching means being operable in its other state to isolate the electrical energy storage means from the DC voltage and to make said connection of the electrical energy storage means with the connection between the output of the rectifier means and the input of the booster means whereby to enable discharge of electrical energy from said electrical energy storage means into the connection between the rectifier means and the booster means, said control means associated with the bistable switching means being responsive to the monitored DC voltage and being operable in response to a fall in said DC voltage to a certain reference level to switch said bistable switching means from its normal said one state to said other state whereby to discharge electrical energy to augment the rectified output of the rectifier means and thereby to counter the sensed tall in said DC voltage.

* * * * *